(12) United States Patent
Yahagi

(10) Patent No.: US 7,873,351 B2
(45) Date of Patent: Jan. 18, 2011

(54) COMMUNICATION RESTRICTION CONTROL SYSTEM AND COMMUNICATION RESTRICTION CONTROL METHOD

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 932 days.

(21) Appl. No.: 11/390,381

(22) Filed: Mar. 28, 2006

(65) Prior Publication Data

US 2006/0223519 A1  Oct. 5, 2006

(30) Foreign Application Priority Data

Mar. 31, 2005  (JP) .............................. 2005-102681

(51) Int. Cl.
  *H04M 1/66* (2006.01)
(52) U.S. Cl. ................. 455/411; 455/422.1; 455/456.4; 455/414.3; 455/41.2; 455/421
(58) Field of Classification Search ......... 455/410–411, 455/421, 456.1, 456.4, 414.1, 414.3, 422.1, 455/567

See application file for complete search history.

(56) References Cited

U.S. PATENT DOCUMENTS

| | | | |
|---|---|---|---|
| 5,404,576 A | | 4/1995 | Yahagi |
| 5,479,476 A | * | 12/1995 | Finke-Anlauff ............. 455/566 |
| 5,790,955 A | * | 8/1998 | Tomoike ..................... 455/453 |
| 5,950,130 A | * | 9/1999 | Coursey ................. 455/432.1 |
| 6,212,390 B1 | * | 4/2001 | Rune ....................... 455/456.6 |
| 6,526,282 B1 | * | 2/2003 | Kadoshima et al. ......... 455/453 |
| 6,622,016 B1 | * | 9/2003 | Sladek et al. ............ 455/414.1 |
| 6,625,455 B1 | * | 9/2003 | Ariga ..................... 455/456.1 |
| 6,748,195 B1 | * | 6/2004 | Phillips ..................... 455/41.2 |
| 6,782,266 B2 | * | 8/2004 | Baer et al. ............... 455/456.4 |
| 6,832,093 B1 | * | 12/2004 | Ranta ...................... 455/456.4 |
| 6,842,617 B2 | * | 1/2005 | Williams et al. ............ 455/444 |
| 6,889,040 B1 | * | 5/2005 | Koo et al. .................... 455/418 |
| 6,907,254 B1 | * | 6/2005 | Westfield ................. 455/456.4 |
| 6,987,978 B2 | * | 1/2006 | Masuda et al. ........... 455/456.4 |
| 7,085,560 B2 | * | 8/2006 | Petermann ............... 455/422.1 |
| 7,092,875 B2 | | 8/2006 | Tsuchinaga et al. |
| 7,280,833 B2 | | 10/2007 | Suda et al. |
| 7,606,938 B2 | * | 10/2009 | Roese et al. ................. 709/242 |
| 7,649,840 B2 | * | 1/2010 | Kalland et al. ........... 370/230.1 |
| 7,693,545 B2 | * | 4/2010 | Park ........................ 455/556.1 |

(Continued)

FOREIGN PATENT DOCUMENTS

GB  2 411 320 A  8/2005

(Continued)

*Primary Examiner*—Sharad Rampuria
(74) *Attorney, Agent, or Firm*—Foley & Lardner LLP

(57) ABSTRACT

The present invention provides a communication restriction control system and a communication restriction control method capable of performing communication restriction control depending on circumstances of communication restriction control area. The mobile terminal transmits a response request signal to a radio response equipment provided in the communication restriction control area which transmits a response signal including identification information as a response to the response request signal. A communication system discriminating equipment which is provided with a database in which the identification information is associated with one of allowed communication circumstances, and allowed communication circumstance is determined by referring to the database according to the identification information, and communication restriction control of the mobile terminal according to the determined result is performed.

27 Claims, 21 Drawing Sheets

U.S. PATENT DOCUMENTS

| | | |
|---|---|---|
| 7,756,531 B2 * | 7/2010 | Aminzadeh ............... 455/456.4 |
| 2002/0173317 A1 * | 11/2002 | Nykanen et al. ............ 455/456 |
| 2003/0032409 A1 * | 2/2003 | Hutcheson et al. .......... 455/414 |
| 2003/0134648 A1 * | 7/2003 | Reed et al. ................. 455/456 |
| 2004/0203667 A1 * | 10/2004 | Schroeder et al. ........ 455/414.1 |
| 2004/0203911 A1 * | 10/2004 | Masuda et al. ........... 455/456.1 |
| 2005/0032527 A1 * | 2/2005 | Sheha et al. ............. 455/456.1 |
| 2005/0048984 A1 * | 3/2005 | Foster et al. ................ 455/453 |
| 2005/0266833 A1 * | 12/2005 | Walker .................... 455/414.1 |
| 2005/0282559 A1 * | 12/2005 | Erskine et al. ........... 455/456.4 |
| 2006/0153160 A1 * | 7/2006 | Kalland et al. .............. 370/351 |

FOREIGN PATENT DOCUMENTS

| | | |
|---|---|---|
| JP | 5-167511 | 7/1993 |
| JP | 8-167090 A | 6/1996 |
| JP | 11-215561 | 8/1999 |
| JP | 11-215562 | 8/1999 |
| JP | 2001-14592 A | 1/2001 |
| JP | 2001-136564 A | 5/2001 |
| JP | 2002-271489 A | 9/2002 |
| JP | 2002-271850 A | 9/2002 |
| JP | 2003-76394 A | 3/2003 |
| JP | 2003-532203 A | 10/2003 |
| JP | 2004-242274 A | 8/2004 |
| WO | WO 01/82213 A2 | 11/2001 |
| WO | WO 2006/048760 A1 | 5/2006 |

* cited by examiner

RESTRICTION ENVIRONMENT
APPROACHES TERMINAL USER

RESTRICTION STATUS
AT CERTAIN TIME (a)

RESTRICTION STATUS
AT ANOTHER TIME PERIOD (b)

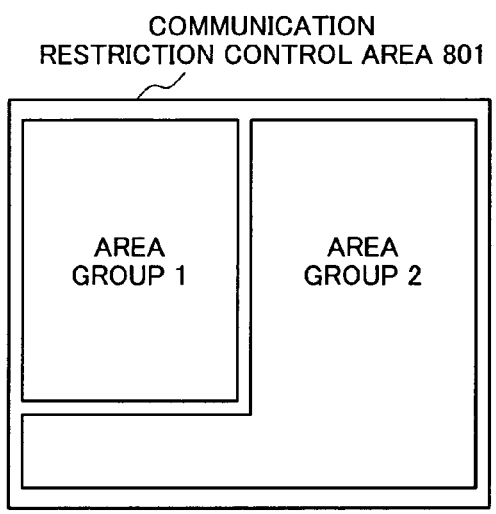
FIG.11A
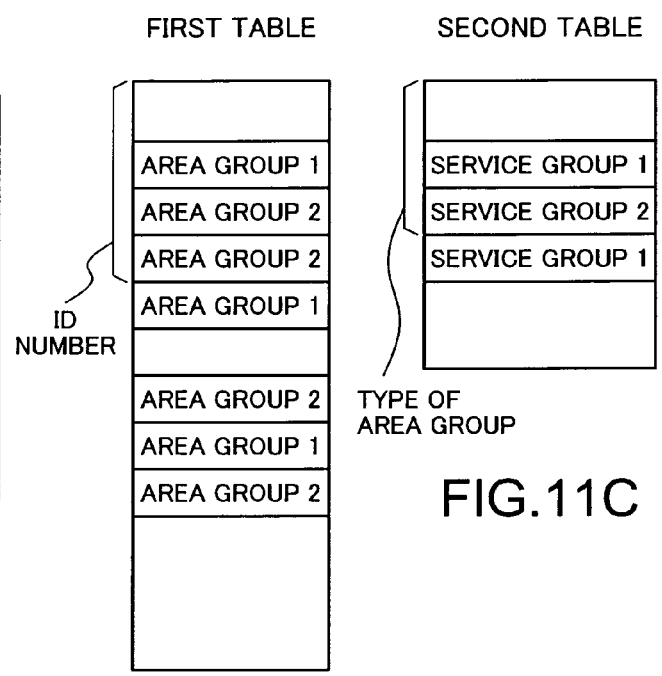
FIG.11B
FIG.11C

COMMUNICATION /SERVICE TYPE
{
| MAXIMUM TRANSMISSION POWER |
| PERMISSION/PROHIBITION OF INTERMITTENT TRANSMISSION |
| MODULATION SYSTEM #1 |
| SERVICE (VOICE) |
| MAXIMUM TRANSMISSION SPEED |
| ⋮ |
| MAXIMUM TRANSMISSION POWER |
| PERMISSION/PROHIBITION OF INTERMITTENT TRANSMISSION |
| MODULATION SYSTEM #2 |
| SERVICE (TEXT) |
| MAXIMUM TRANSMISSION SPEED |

FIG.14

| FIRST TABLE | |
|---|---|
| RADIO RESPONSE EQUIPMENT IDENTIFICATION NUMBER | DEVICE TYPE NUMBER #1 |
| | DEVICE TYPE NUMBER #2, DEVICE TYPE NUMBER #5 |
| | DEVICE TYPE NUMBER #1 |
| | DEVICE TYPE NUMBER #3 |
| | ⋮ |

FIG.15A

| SECOND TABLE | |
|---|---|
| DEVICE TYPE NUMBER | HEARING AID #1 |
| | HEARING AID #2 |
| | HEART PACEMAKER #1 |
| | HEART PACEMAKER #2 |
| | ILLNESS #1 |
| | ILLNESS #2 |
| | ⋮ |

FIG.15B

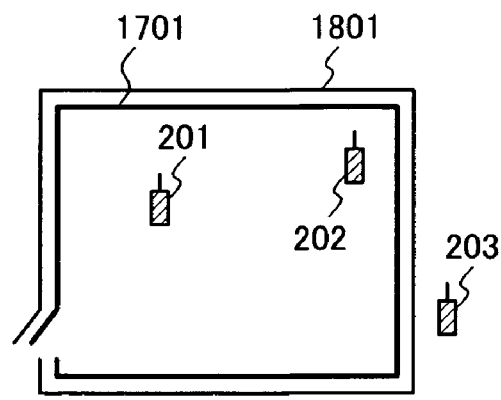
FIG.30
PRIOR ART
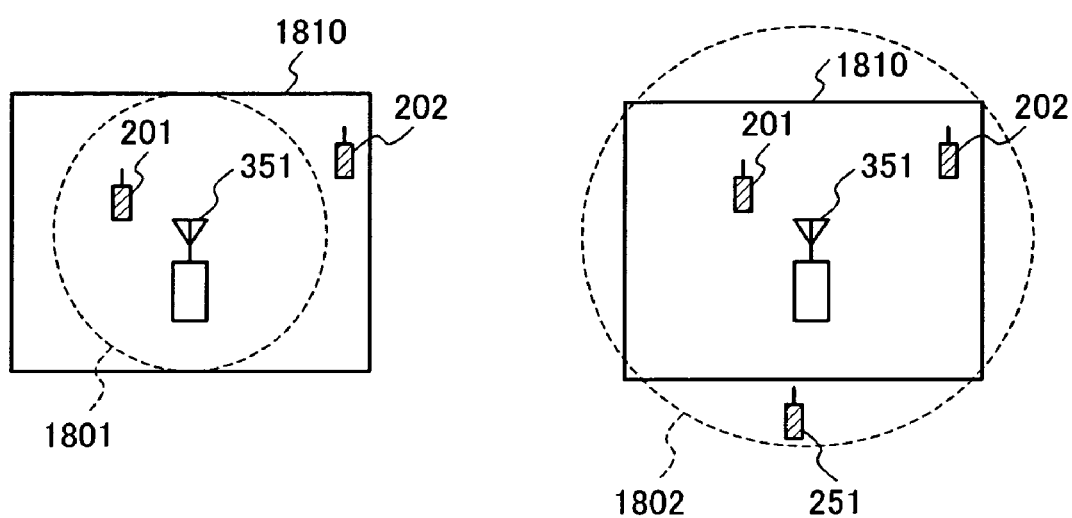
FIG.31A
PRIOR ART
FIG.31B
PRIOR ART

COMMUNICATION RESTRICTION CONTROL SYSTEM AND COMMUNICATION RESTRICTION CONTROL METHOD

BACKGROUND OF THE INVENTION

1. Field of the Invention

The present invention relates to a system and a method for restricting the communication using a mobile terminal represented by a mobile telephone and a PHS (personal handy phone system) terminal.

2. Description of the Related Art

When a mobile communications system such as a car phone system, a mobile telephone system, etc. has first introduced, enormous efforts have been expended for extending the communication range (service area) for mobile terminal users. To enlarge the service area, it has been necessary to install a large number of radio base stations (access points) for communications with mobile terminals in a wider communication range. To attain the purpose, the initial development of the mobile communications system when it was introduced was to produce an apparatus for constituting the radio base station at a lower cost.

Then, the service area has been enlarged, the convenience of the mobile communications system has been widely recognized, and the number of mobile terminal user has sharply increased. As a result, the communication traffic increased, and the insufficient communication capacity has become the problem to be solved. To solve the problem, the number of communication channel to be used for the mobile communications had to be extended, that is, the "communication traffic per unit area" had to be extended. To realize this, a transmission system with high communication efficiency, a high-performance coding system in a voice transmission service, a dynamic channel assignment system for dynamically arranging communication channels for realizing the communication density depending on the geographical/timing factor, etc. have been developed.

Furthermore, variations of new applications have demanded providing various types of services, that is, multimedia services including conventional telephone services and distributing services of text, images, etc.

Thus, in the mobile communications system, to allow a larger number of users to enjoy communication services, it has been necessary to deal with a wide distribution of time-varying user mobile terminals with high density.

However, contrary to the technical tendency to require high communication capability, there is a request to suppress the communication capability. That is, there is a request to restrict communication by mobile terminals in a specific area. There is the possibility that the communication using a mobile telephone, etc. can be nuisance to people around, and the related trouble has increased these days.

Actually, in the communication using a mobile telephone, the telephone conversation can be nuisance to the people around. Furthermore, the ringing sound (beep, electronic sound, melody, etc.) activated when a call is terminated might surprise the people around, which considered to be nuisance. From the point of view that such nuisance has to be suppressed, there are places where a notice or a warning to inhibit the communication using a mobile terminal. However, some users ignore the notice or warning and continue the telephone conversation using their mobile terminals. In addition, since a piece of advice by a person nearby to such a mobile terminal user to stop using the mobile terminal could cause trouble, the use of the mobile terminal is normally overlooked as is. The situation occurs in the places where silence is demanded such as a public transportation, for example, a train, a bus, etc., a concert hall, a lecture hall, a conference room, etc.

It is also pointed out that there may be the possibility of undesired influence of an electromagnetic wave emitted from a mobile terminal on an electronic equipment device, for example, a heart pacemaker, a hearing aid, a medical equipment, etc. For example, there is the case where the electromagnetic wave energy from a mobile terminal causes a malfunction of the clock mechanism of an electronic equipment device and a data processing mechanism, resulting in an incompetent electronic equipment device. Thus, the heart pacemaker, etc. can cause a serious crisis to a life. Thus, in a place where there is a person having a heart pacemaker implanted or having a hearing aid applied, or in a hospital wing or an operation room where medical equipment is installed, it is requested that the use of a mobile terminal is strictly restricted.

The above-mentioned restriction refers to an example of an unconditional restriction of the services to a user. Aside from this, under the conditions of places and timing, services for users can be selectively restricted. For example, there can be selective restriction depending on the positions in a train by, for example, prohibiting the power-on of a mobile terminal around the priority seats, and prohibiting the ringing sound and voice conversation using a mobile terminal but permitting the communication service not making noise such as transmission and reception of e-mail at the other places in the train. There is also a case there are selective restrictions depending on the situation of the places by, for example, stopping services in the time of a crowd, etc. when people are close to one another, and permitting the services in no-crowd time.

Furthermore, a mobile terminal has the function of so-called "location registration" to report the location of the user terminal to the mobile communication network. Since the function is constantly operated, the mobile terminal constantly radiates radio wave even in the waiting state. The radiated radio wave also has an influence on the medical equipment nearby.

As described above, for the communication services to the mobile terminal users, there are the places and time to be restricted depending on the circumstances, and an appropriate method for realizing the communication service restriction in the places and time is demanded. To meet the demand, there are a number of methods adopted.

As a method of restricting the communication service depending on the circumstances of the user, there is a method of disabling the communication of the mobile terminal in the communication area by the technical mechanism in addition to the method of notifying mobile terminal users that voice communication is prohibited by putting up a notice or broadcasting by voice. The method can be roughly classified into (1) a method of cutting off an extraneous radio wave for the mobile communications from the outside area and disabling the communication function of a mobile terminal itself in the area (first method), (2) a method of providing an interference wave for a radio frequency used by mobile terminals and making the communication function of a mobile terminal not to work properly in the area (second method), (3) a method of notifying mobile terminals by transmitting a signal for suppressing the communication at a radio frequency different from the radio frequency used by the mobile terminals (third method), (4) a method of suppressing the communication in the location area of the mobile terminal by recognizing the location area (fourth method), and (5) other methods.

The first method is a method for physically setting a wall material, etc. for cutting off a radio wave for the mobile communications such that the entire space where mobile terminals exist should be covered, and disabling the communication function of a mobile terminal itself in the area. FIG. 30 shows an example of the first method. By referring to FIG. 30, the space of area 1801 in which the communication is to be restricted is covered with a wall material 1701 for cutting off a radio wave for the mobile communications. Mobile terminals 201 and 202 in the area 1801 are service-restricted, and the mobile terminal 203 outside the area 1801 is not service-restricted. A radio base station having a communication area for covering the area 1801 is installed at a place not shown in the drawing.

In the first method, the cost for setting the wall material 1701, etc. for cutting off a radio wave for the mobile communications is required. In addition, it is necessary to remove the wall material 1701 if the area 1801 is to back to normal area in which the communication can be allowed after setting the wall material 1701. Therefore, it is difficult to apply this method to the place such as a concert hall, etc. where communication restriction is released after an event is over.

It is also difficult to apply this method to a train, etc. Applying a radio wave cutoff material or a radio wave absorber to a train causes passengers to feel confined visually and in ventilation. When a window of the train is open, the radio wave cutoff state cannot be maintained.

As described above, the place where the first method is applied is limited to a place where communications are constantly prohibited, a place where the presence of the radio wave cutoff material is not annoying, a place where the radio wave cutoff material setting cost is acceptable, etc.

The second method is to providing a noise radio signal and making the communication function of a mobile terminal not to work properly in the area, and expecting the use of a mobile terminal is abandoned. FIGS. 31A and 31B show examples of the second method. In FIG. 31A, a noise radio signal source 351 is provided in an area 1810 in which services are restricted. The size of the area 1801, where the services are practically restricted, depends on the intensity of the noise radio signal from the noise radio signal source 351. The communication of the mobile terminal 201 in the area 1801 is prevented by the noise radio signal from the noise radio signal source 351, and the services are practically restricted. Since the communication of the mobile terminal 202 outside the area 1801 is not prevented by the noise radio signal from the noise radio signal source 351, the services are not restricted.

In the second method, since it is necessary to provide power supply equipment for constantly supplying electric power to the noise radio signal source 351 for generating a noise radio signal in addition to the noise radio signal source 351 itself, the method is costly.

There is a method of a radio base station coverage area control system described in the patent document 1 (Japanese Patent Application Laid-open No. H5-167511). This system is similar to the second method for preventing the communication service by generating noisy radio signals using the same frequency as the mobile terminals in the coverage area of the mobile communications system. According to the system, since the noise radio signal can be generated/stopped for activating/releasing the service restriction, it is more advantageous than the first method in that the communication status can be controlled in terms of time. However, since it is difficult to design the range reached by the noise radio signal radiated from the noise radio signal source in a geographically precise shape, it is difficult to strictly provide the area for restricting the communication of a mobile terminal. The area 1801, in which the communication of a mobile terminal is to be restricted by the noise radio signal, forms spherical shape or ellipsoidal shape. For example, as shown in FIG. 31A, when the shape of the area 1810, in which the communications of mobile terminals are to be restricted, is box-shaped, and if the area 1801 is set to be stored in the area 1810, services for mobile terminals cannot be restricted at the corners of the area 1810. On the other hand, as shown in FIG. 31B, when an area 1802 is made larger than the area 1810, and services for mobile terminals can be restricted at the corners of the area 1810, communications are restricted also on the mobile terminal 251 outside the area 1810.

As the methods for solving the above-mentioned problems, there are a method of using plural noise radio signal sources of noise radio signal having a short distance reached and a method of providing the radiation pattern of the antenna of the noise radio signal source in the shape of the area 1810. Since the former uses plural noise radio signal sources, the cost increases. Since the latter also requires a high-performance and costly equipment using the antenna radiation technology (for example, adaptive array antenna) of varying the antenna radiation pattern, it is not practical and lacks the flexibility in changing an arrangement.

The third method is different from the method of generating noise radio signal in the view point of a radio frequency which is different from the radio frequency used in the communication by mobile terminals, and is also different from the second method in the view point of a nature of signal which is a notice signal to be broadcasted to mobile terminals. As the third method, there is disclosures of a ringing sound control method of the radio mobile communication terminal, a radio mobile communication terminal, and a radio mobile communications system described in the patent document 2 (Japanese Patent Application Laid-open No. H11-215561), and a mobile radio equipment, a mobile communications system, and a communication restriction control method for the mobile radio equipment described in the patent document 3 (Japanese Patent Application Laid-open No. H11-215562). A service restriction control base station replaces the noise radio signal source 351 shown in FIGS. 31A and 31B. Services are restricted by mobile terminals receiving a signal of a notice of service restriction from the service restriction control base station.

Also in the third method, as in the case of the second method, it is difficult to have the same shapes between the area 1801 and the area 1810. Therefore, as explained above-mentioned by referring to the second method, services could not be restricted at the corners of the area 1810, or a mobile terminal outside the area 1810 could be service-restricted depending on the size of the area 1801. It may be possible to solve the problem by forming the shape of the area 1801 to be close to the shape of the area 1801 by changing the distance reached by a notice signal from the service restriction control base station. However, in this case, there is the problem similar to the problem explained in the second method.

The fourth method is a method of recognizing the area in which mobile terminals are located and discriminating whether or not communications are to be suppressed in the area. One of the discriminating methods is to obtain the position coordinates information about the location of mobile terminal by a positioning system, etc. and determine the necessity to suppress services according to the position coordinates information. This method is disclosed by, for example, a use restriction method of mobile station and a mobile communications system described in the patent document 4 (Japanese Patent Application Laid-open No. 2001-136564). Another method is to provide a mechanism of detecting by an additional sensor whether or not a mobile terminal has entered a communication suppressed area or whether or not a mobile terminal has exited the communication suppressed area, and perform the communication suppressing process by grasping whether or not there is a mobile terminal in the communication suppressed area. This method is disclosed by a mobile telephone communication suppression equipment and the method described in the patent document 5 (Japanese Patent Application Laid-open No. 2002-271850).

In the case of the method disclosed by the patent document 4, it is necessary to mount the positioning system into a mobile terminal. Therefore, the mobile terminal becomes large and costly. When a positioning system uses a communication satellite such as a GPS (global positioning system), etc., a larger mechanism is required, and the system is disadvantageous in mobility. In addition, there occurs the problem that the method cannot be used in the place (in a building, an underground space, etc,) where radio signals from the communication satellite cannot be received.

In the case of the method disclosed by the patent document 5, it is necessary to correctly recognize the entry and the exit of the mobile terminal in an entrance area. However, when the entry or the exit of the mobile terminal is detected, and then a sensor does not correctly work for any reason (for example, the difference in sensitivity of a sensor depending on the location of the sensor, the entry and the exit through a gate other than the gate where the sensor is placed, the action of cutting off a radio signal from the sensor incidentally or intentionally), the system cannot correctly recognize the entry or the exit of the mobile terminal. In this case, the communication of mobile terminal that has entered a specific area cannot be appropriate restricted, or the communication of mobile terminal that has exited a specific area could be continuously suppressed.

Mainly described above are the methods of suppressing the communication service of mobile terminal. On the other hand, there is also a request to provide a selective restriction of service by not uniquely determining an allowed service depending on the current location of mobile terminal, but prohibiting a certain service and permitting other services selectively. For example, in a train, the voice communication using a mobile terminal is prohibited, but transmission or reception of text data (for example, e-mail, etc.) is permitted. In the situation, a method of notifying a user of a mobile terminal of the information on the notice or by voice announcement is used. However, the restriction by this method largely depends on the personal manner of a user of mobile terminal, and services cannot be restricted on persons of poor manners.

In the above-mentioned cases, when the first method is applied, not only the voice communication but also all other communications of mobile terminals in a train are disabled, and the selective service restriction cannot be performed. The first method can be applied only when all communication services for mobile terminals are disabled.

Similarly, when the second method is applied, not only the voice communication but also all other communications of mobile terminals are disabled, and the selective service restriction cannot be performed. The second method also can be applied only when all communication services for mobile terminals are disabled.

The third method can selectively restrict the services, like A) prohibiting both voice communication and other communications, B) prohibiting only voice communication, or C) permitting all services, etc., depending on the contents of notice signal. However, when a restricted area is provided, the geographical precision cannot be satisfied.

The fourth method can also selectively restrict services by defining a service restriction condition in advance on a region or an area in which mobile terminals are located. However, there is a place where a positioning process cannot be performed, and the current location of mobile terminal cannot be recognized in such a case.

A recent mobile terminal has various functions, and the causes of undesired influences and unpleasantness to the people around are not limited to voice communications or ringing sounds. For example, when music data accumulated in the memory of a mobile terminal is replayed, the reproduced sound can be noisy to the people around. Furthermore, there can be nuisance that a person carrying a mobile terminal having the voice recording mechanism and image recording mechanism (not limited to static images or moving pictures) takes a picture of other persons without permission. These problems are also left to the personal manners of users, and there are no effective countermeasures against the users of poor manners. The main cause of the problems is that the operations of a mobile terminal such as replaying and recording sound and images, etc. are so-called offline operations in which a mobile terminal is operated as disconnected from a communication system, and it is considered that it is not necessary for the communication system to suppress or restrict the operations. However, the nuisance by these functions to the people around has recently been recognized as a serious problem, and there is a request to restrict or suppress the nuisance use in any method.

In addition to the above-mentioned problems, there is another aspect to be solved. It is desired to provide a communication system which can execute or restrict services depending on the current location of a mobile terminal or the surrounding circumstances of a mobile terminal. The conventional methods of restricting the communication of a mobile terminal are to equally restrict the communication services such as voice communication, reception of a call, ringing sound, transmission/reception of e-mail, etc. by an alternative between prohibition and permission for all mobile terminals or a part of mobile terminals in the restricted area. Therefore, it is difficult to perform flexible communication and service restriction depending on the place and circumstances. Practical requests and problems are described below.

The advantage of the communication restriction control of a mobile terminal is to suppress inconvenience and the influence on electronic equipment, but there are various circumstances in which communication restriction control is demanded, and there is a case where communication restriction control is not required depending on the circumstances. For example, it is not necessary to restrict communication of a mobile terminal when there is no person near by who has an implanted biomedical equipment and is affected by electromagnetic wave energy emitted by a mobile terminal. For example, when there is no passenger sitting on the priority seat, the situation occurs.

The energy type of a radio wave emitted by a mobile terminal (the amount of transmission electric power, or continuity/intermittence of radio wave energy radiated for the transmission of a signal) depends on the communication system, and some energy types have a small influence on electronic equipment such as biomedical equipment, etc., and there is a case where no communication restriction control is required. Practically, the influence of electromagnetic wave energy on biomedical equipment can be a damage of equipment itself by the electromagnetic wave energy radiated from a mobile terminal, a malfunction of biomedical equipment for which no sufficient countermeasure is taken against an electromagnetic wave by noise power in a pulse form generated by the intermittent radiation of electromagnetic wave energy. However, the level of the influence depends on the communication system. For example, electronic equipment, which indicates a malfunction by the electromagnetic wave energy (noise power in a pulse form) from a mobile terminal of the TDMA (time division multiple access) system, may not indicate a malfunction by the electromagnetic wave energy of the CDMA (code division multiple access) system.

An influence on electronic equipment also relates to the communication speed with reference to the transfer rate of the transfer information. When the communication speed with reference to the transfer rate of the transfer information is high, the required amount of transmission power increases, and it has a large influence on such electronic equipment. However, when the communication speed with reference to the transfer rate of the transfer information is low, the required amount of transmission power decreases, and it has a small influence. Thus, by reducing the communication speed with reference to the transfer rate of the transfer information, the influence on electronic equipment such as a malfunction, etc. can be suppressed, and it is not necessary to turn off the power supply to a mobile terminal or completely cut off the communication of a mobile terminal.

SUMMARY OF THE INVENTION

The advantage of the present invention is to solve the above-mentioned problems, and provide a communication restriction control system and a communication restriction control method capable of performing communication restriction control depending on the location of mobile terminal and circumstances by specifying communication system, communication quality, communication services, etc.

The first aspect of the present invention is a communication restriction control system for controlling communication restriction by specifying a communication system depending on the location of mobile terminal and circumstances. The first aspect has the following configuration.

The system includes a mobile terminal which performs communication over a mobile communication network using at least one of plural communication systems and transmits a response request signal in radio communication when the communication starts, a radio response equipment which can perform radio communication in a range of a predetermined communication distance and transmits a response signal including identification information of the radio response equipment when the response request signal is received, and a communication system discriminating equipment which is provided with a database storing information in which the identification information of the radio response equipment is associated with a communication system to which restriction control is to be performed, performs communication with the mobile terminal through a mobile communication network, determines the communication system to which restriction control is to be performed by referring to the database according to the identification information of the radio response equipment when the identification information of the radio response equipment is received from the mobile terminal which has received the response signal of the radio response equipment, and performs communication restriction control (to be restricted or to be allowed) of the mobile terminal according to the determined communication system.

With the above-mentioned configuration, a database is referred to according to the radio response equipment identification information acquired from the peripheral radio response equipment, and the communication system to which restriction control is to be performed is determined. By storing in the database an arbitrarily specified communication system such as the CDMA, TDMA, etc; associated with the identification information of the radio response equipment, the restriction control for a mobile terminal using the arbitrarily specified communication system can be performed in the location where the radio response equipment is placed. For example, by storing in the database the CDMA system associated with the identification information of the radio response equipment, the communications of the mobile terminals using the CDMA system only are enabled in the location where the radio response equipment is placed, and the communications of the mobile terminals using the other communication systems are disabled. Thus, the communication system depending on the current location of mobile terminal can be specified.

Furthermore, a radio communication range with the radio response equipment can be a communication restriction control area. The distance of the radio communication range with the radio response equipment is 2 or 3 m when the RFID (radio frequency identification) is used. Thus, since the communication distance is short, the communication restriction control area can be more accurately provided.

The second aspect of the present invention is a communication restriction control system for controlling communication restriction by specifying communication quality depending on the location of mobile terminal and circumstances. The second aspect is different from the first aspect in mobile terminal and communication system discriminating equipment as follows.

The communication of the mobile terminal is enabled with different communication quality over the mobile communication network, and the communication system discriminating equipment has a database storing the information with the identification information of the radio response equipment associated with the communication quality, determines communication quality to which restriction control is to be performed by referring to the database according to received identification information when the radio response equipment identification information is received, and controls the communication restriction for the mobile terminal based on the determined communication quality.

With the above-mentioned configuration, the communication quality to which restriction control is to be performed is determined by referring to the database according to the radio response equipment identification information acquired from the peripheral radio response equipment. By storing in the database arbitrarily specified communication quality (communication speed with reference to the transfer rate of the transfer information, etc.) with the identification information of the radio response equipment, the restriction control for mobile terminal can be performed with the arbitrarily specified communication quality in the area where the radio response equipment is placed. For example, by storing in the database the communication speed with reference to the transfer rate of the transfer information of the mobile terminal, which is slower than the normal speed, associated with the identification information of the radio response equipment, only the communication of the mobile terminal can be enabled at the lower communication speed in the area where the radio response equipment is placed. Thus, communication quality can be specified depending on the current location of mobile terminal.

The third aspect of the present invention is a communication restriction control system for controlling communication restriction by specifying communication service depending on the location of mobile terminal and circumstances. The third aspect is different from the first aspect in mobile terminal and communication system discriminating equipment as follows.

The communication of the mobile terminal is enabled with different communication service over the mobile communication network, and the communication system discriminating equipment has a database storing the information with the identification information of the radio response equipment associated with the communication service, determines communication service to which restriction control is to be performed by referring to the database according to received identification information when the radio response equipment identification information is received, and controls the communication restriction for the mobile terminal based on the determined communication service.

With the above-mentioned configuration, the communication service to which restriction control is to be performed is determined by referring to the database according to the radio response equipment identification information acquired from the peripheral radio response equipment. By storing in the database arbitrarily specified communication service (e-mail, etc.) with the identification information of the radio response equipment, the restriction control for a mobile terminal using the arbitrarily specified communication service is performed in the area where the radio response equipment is placed. For example, by storing in the database the communication service relating to the e-mail associated with the identification information of the radio response equipment is to be restricted, the communication of the mobile terminal by using the e-mail is restricted in the area where the radio response equipment is placed. Thus, a communication service can be specified depending on the current location of mobile terminal.

In the above-mentioned first to third aspects of the present invention, when the radio response equipment is a non-fixed type radio response equipment, the database is referred to the radio response equipment identification information acquired from the non-fixed type radio response equipment, and the communication system, the communication quality, or the communication service of the mobile terminal is determined. For example, when a user of a heart pacemaker who carries the non-fixed type radio response equipment approaches a mobile terminal, the mobile terminal provides the communication system discriminating equipment with the radio response equipment identification information of the non-fixed type radio response equipment. The communication system discriminating equipment refers to the database according to the radio response equipment identification information, and determines the communication system, the communication quality, or the communication service to which restriction control is to be performed. Thus, the communication system, the communication quality, the communication service, etc. can be determined depending on the circumstances of the mobile terminal.

According to the present invention, since the communication system, the communication quality, the communication service, etc. can be specified depending on the place and the circumstances of the mobile terminal, there is the effect of improving the convenience of the mobile terminal.

Also according to the present invention, since the communication system can be realized only by installing the communication system discriminating equipment on the mobile communication network, the present invention is more advantageous in cost than the conventional system.

BRIEF DESCRIPTION OF THE DRAWINGS

Exemplary features and advantages of the present invention will become apparent from the following detailed description when taken with the accompanying drawings in which:

FIGS. 11A, 11B, and 11C show another data structure of a database;

FIG. 14 shows another data structure of a database;

FIGS. 15A and 15B show another data structure of a database;

FIG. 30 is a schematic drawing for explanation of the conventional method using a radio cutoff material; and FIGS. 31A and 31B are schematic drawings showing the conventional method using a noise radio signal source.

DESCRIPTION OF THE EXEMPLARY EMBODIMENTS

The best modes for embodying the present invention are explained by referring to the attached drawings.

Figure 1:
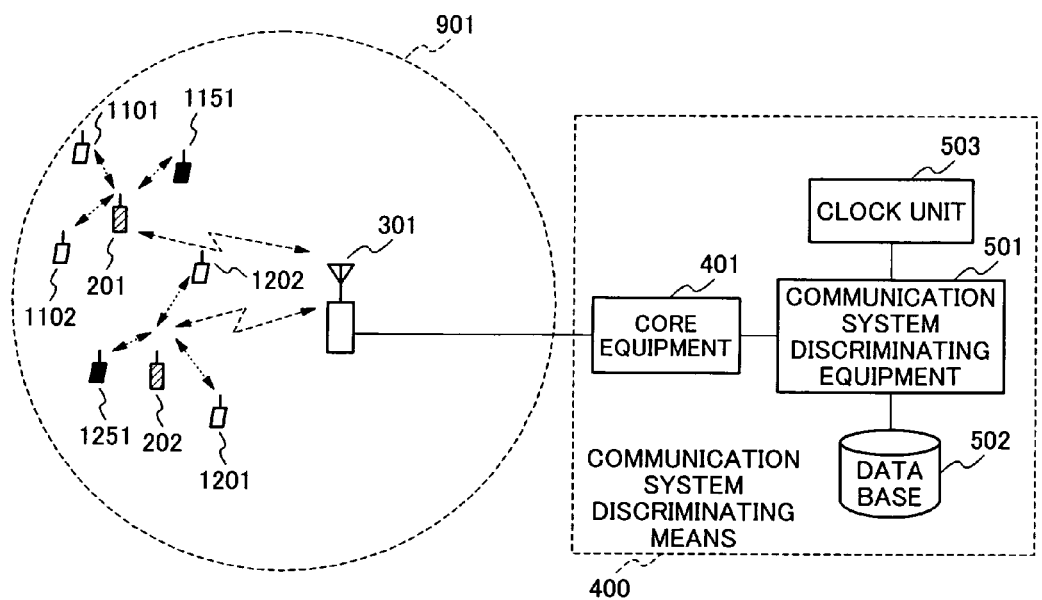
FIG. 1 is a block diagram showing the rough configuration of the communication restriction control system according to the first embodiment of the present invention.

FIG. 1 is a block diagram showing the rough configuration of the communication restriction control system according to the first embodiment of the present invention. In FIG. 1, the communication restriction control system includes mobile terminals 201 and 202, fixed type radio response equipments 1101, 1102, 1201, and 1202, non-fixed type radio response equipments 1151 and 1251, a radio base station 301, a core equipment 401, and a communication system discriminating equipment 501.

Each of the fixed type radio response equipments 1101, 1102, 1201, and 1202 can be a radio tag represented by an IC card and an RFID (radio frequency-identification), and the radio communication area is fixed. That is, these fixed type radio response equipments are arranged in standing-still. For example, a radio tag is placed on a fixture (a fixed chair, wall, ceiling, floor, etc.) installed in a facility such as a concert hall, a movie theater, a building, etc.

Each of the non-fixed type radio response equipments 1151 and 1251 also can be radio tag, and the radio communication area is moving. That is, these non-fixed type radio response equipments are arranged in a geographically movable state. For example, the arrangement in the geographically movable state corresponds to setting a radio tag on a moving object and arranging a radio tag on what is attached to or held by a user.

The mobile terminals 201 and 202 can be mobile terminals represented by a mobile telephone and a PHS phone, and have the function of a radio communication with the fixed type radio response equipments 1101, 1102, 1201, and 1202, and also with the non-fixed type radio response equipments 1151 and 1251. When the radio response equipment is a radio tag (RFID), the function of the radio communication is a function as a radio tag read device (RFID reader) capable of reading the tag information. The mobile terminals 201 and 202 can transfer the radio response equipment identification information (that is, tag information) obtained from the fixed type radio response equipment and the non-fixed type radio response equipment to the communication system discriminating equipment 501 as its upper hierarchical station through the radio base station 301.

The radio base station 301 forms a radio access network which is the radio communication area of the mobile communication network. In the radio communication area of the radio base station 301, each communication services such as the existing voice communication service, data communication service, etc. are provided to the mobile terminals 201 and 202, and the mobile terminals 201 and 202 can communicate with the core equipment 401 and the communication system discriminating equipment 501.

The core equipment 401 assigns a communication system for communication restriction control (to be restricted or to be allowed) based on the discrimination result of the communication system discriminating equipment 501 to the mobile terminal connected through the radio base station 301.

The communication system discriminating equipment 501 knows the location of mobile terminal according to the radio response equipment identification information, which has been read from the fixed type radio response equipment or both fixed type and the non-fixed type radio response equipments by the mobile terminal and transferred through the radio base station 301, and determines a communication system for the communication restriction control in an area where the mobile terminal is locating. The communication system discriminating equipment 501 has a database 502 which stores necessary information for determining the communication system as associated with the radio response equipment identification information having been received, and determines the communication system to be specified for the communication restriction control by extracting corresponding information from the database 502 using the radio response equipment identification information as a retrieval key. Furthermore, the core equipment 401 itself can perform a discriminating process of the communication system by incorporating the function of the communication system discriminating equipment 501 into the core equipment 401. In addition, the communication system discriminating equipment 501 and the core equipment 401 can form communication system discrimination means 400.

A service area 901 is an area in which a communication service for a mobile terminal can be provided. The service area 901 can be a radio communication area of one or more radio base stations. FIG. 1 shows only one radio base station 301 for the sake of simplicity in the service area 901.

Additionally, although FIG. 1 shows only four fixed type radio response equipments 1101, 1102, 1201, and 1202, there can be practically a plurality of fixed type radio response equipments arranged in the service area 901.

Furthermore, although FIG. 1 shows two non-fixed type radio response equipments 1151 and 1251 are shown for the sake of simplicity, the non-fixed type radio response equipment is attached to or placed on a moving object or a person. Therefore, the number of the non-fixed type radio response equipments located in the service area 901 varies.

In the communication restriction control system according to the present embodiment, a mobile terminal obtains the radio response equipment identification information from a fixed type radio response equipment or both fixed type and non-fixed type radio response equipments arranged around the location of mobile terminal in the service area 901, and transfers the obtained radio response equipment identification information to the communication system discriminating equipment 501 through the radio base station 301. When the radio response equipment identification information is transferred, the mobile terminal provides terminal identification information (terminal ID) for identifying own mobile terminal to the core equipment 401 through the radio base station 301. When radio response equipment identification information is transferred from a mobile terminal, the communication system discriminating equipment 501 specifies the location of the mobile terminal and determines the communication system for the communication restriction control by extracting corresponding information from the database 502 using the radio response equipment identification information. Then, the communication system discriminating equipment 501 provides the determined communication system to the core equipment 401. Then, the core equipment 401 controls the communication system of the mobile terminal based on the terminal identification information obtained from the mobile terminal and the determined communication system provided from the communication system discriminating equipment 501.

According to the above-mentioned communication restriction control system, in the service area 901, for example, only an arbitrarily specified communication system among several communication systems such as the CDMA, TDMA, etc., can be assigned for the communication system to be allowed (or to be restricted). For example, when the CDMA system is assigned for the communication system to be allowed, in the service area 901, radio access communication by only a mobile terminal using the CDMA system can be enabled, and the radio access communication by other mobile terminals using the communication systems other than the CDMA system is disabled. Practically, when the mobile terminal 201 uses the CDMA system and the mobile terminal 202 uses the TDMA system, only the mobile terminal 201 is enabled.

In place of the communication restriction control based on the communication system, communication restriction control can be performed based on various conditions such as communication quality (communication speed with reference to the transfer rate of the transfer information), services (e-mail, access to a Web page, etc.), etc. In this case, it is necessary to register in a database the radio response equipment identification information associated with the contents of communication quality or a service to be specified for the communication restriction control. Different types of communication quality (communication speed with reference to the transfer rate of the transfer information, etc.) or different communication services can be assigned for each of the mobile terminals 201 and 202. The communication restriction is controlled based on the communication quality or the communication service determined by the communication system discriminating equipment 501.

Described below in detail is the operation of the communication restriction control in the communication restriction control system according to the present embodiment.

First, the operation of obtaining the radio response equipment identification information is explained.

Figure 2:
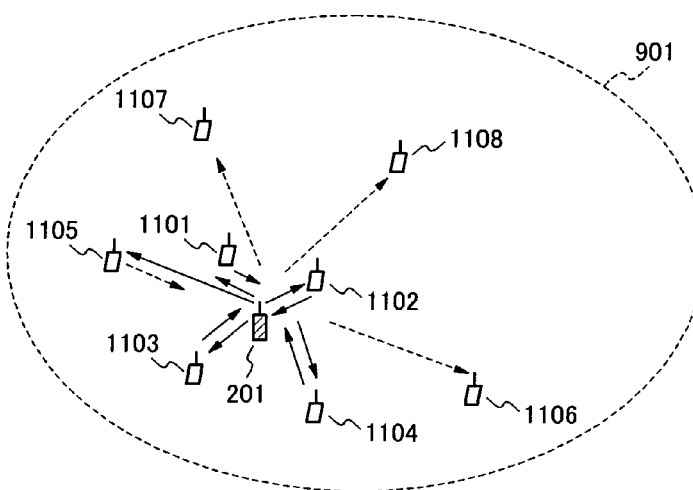
FIG. 2 is a schematic drawing showing the concept of the process of a mobile terminal acquiring the radio response equipment identification information from the fixed type radio response equipment.

FIG. 2 is a schematic drawing showing the process of a mobile terminal acquiring the radio response equipment identification information from the fixed type radio response equipment. In FIG. 2, assume that the mobile terminal 201 is locating in the service area 901, and the fixed type radio response equipments 1101 to 1108 exist in the vicinity. In the present explanation, a fixed type radio response equipment is exemplified, but it can be a non-fixed type radio response equipment or a combination of a fixed type radio response equipment and a non-fixed type radio response equipment for the same operations. The fixed type radio response equipments 1101 to 1104 are located in the distance range in which the radio communication with the mobile terminal 201 can be enabled. The fixed type radio response equipment 1105 is locating such that although it can receive a response request signal (radio signal) from the mobile terminal 201, the response signal (radio signal) from the fixed type radio response equipment 1105 cannot reach the mobile terminal 201. The fixed type radio response equipments 1106 to 1108 are locating such that the mutual radio communication with the mobile terminal 201 cannot be performed.

The mobile terminal 201 transmits a response request signal with predetermined timing (practically, with the timing when the communication starts or at predetermined time period during a communication service) to the peripheral fixed type radio response equipments. The response request signal transmitted from the mobile terminal 201 is received by the fixed type radio response equipments 1101 to 1105. When each of the fixed type radio response equipments 1101 to 1105 receives a response request signal from the mobile terminal 201, it transmits the radio response equipment identification information (radio signal) stored in the memory of the own equipment in advance.

The mobile terminal 201 receives the radio response equipment identification information from each of the fixed type radio response equipments 1101 to 1104 locating in a range in which mutual communication is enabled. When the mobile terminal 201 receives the radio response equipment identification information, it provides the received radio response equipment identification information through the radio base station 301 and the core equipment 401 to the communication system discriminating equipment 501 as their upper hierarchical station.

The communication system discriminating equipment 501 can specify the location of mobile terminal 201 and determine a communication system to be controlled in an area in which the mobile terminal 201 is locating according to the radio response equipment identification information acquired as described above and the database.

The acquisition of the radio response equipment identification information from the fixed type radio response equipment is described above. When there is the non-fixed type radio response equipment around the mobile terminal (in the distance range in which mutual radio communication is enabled), the mobile terminal also obtains the radio response equipment identification information from the non-fixed type radio response equipment, and provides it to the communication system discriminating equipment 501.

Figure 3:
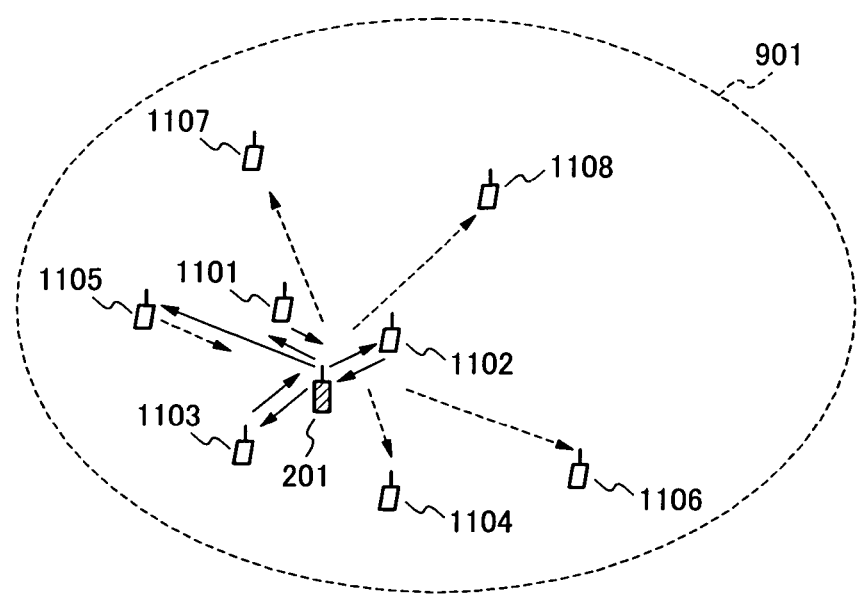
FIG. 3 is a schematic drawing showing another concept of the process of a mobile terminal acquiring the radio response equipment identification information from the fixed type radio response equipment.

Next, similar to the embodiment shown in FIG. 2, the embodiment, in which the response to the response request signal by fixed type radio response equipment varies depending on the power intensity of the response request signal (radio signal) transmitted from the mobile terminal 201, is shown in FIG. 3. In FIG. 3, the spatial positions of the fixed type radio response equipments 1101 to 1108 located around the mobile terminal 201 are the same as those shown in FIG. 2. However, when the power intensity of the response request signal (radio signal) transmitted from the mobile terminal 201 is reduced, the range of the fixed type radio response equipment capable of receiving the response request signal (radio signal) is limited to an arrow area. That is, as compared with the case shown in FIG. 2, only the fixed type radio response equipment locating closer to the mobile terminal 201 can receive the response request signal and transmit the response signal.

As a result, the received radio response equipment identification information also varies. That is, in FIG. 2, the fixed type radio response equipments 1101 to 1105 can receive the response request signal (radio signal) from the mobile terminal 201, the response signals of the fixed type radio response equipments 1101 to 1104 are received by the mobile terminal 201, and the radio response equipment identification information of the fixed type radio response equipments 1101 to 1104 is to be transferred to the communication system discriminating equipment 501. However, in FIG. 3, only the fixed type radio response equipments 1101 to 1103 can receive the response request signal (radio signal) from the mobile terminal 201, the response signals from the fixed type radio response equipments 1101 to 1103 are received by the mobile terminal 201, and the radio response equipment identification information of the fixed type radio response equipments 1101 to 1103 is transferred to the communication system discriminating equipment 501.

The radio response equipment identification information transferred by the mobile terminal 201 to the communication system discriminating equipment 501 indicates the presence of the fixed type or non-fixed type radio response equipment around the mobile terminal 201. Therefore, the difference in the collected radio response equipment identification information is the factor in determining the communication system and communication quality to be controlled around the mobile terminal 201. It indicates that the size of the area to be selected in which the communication system and communication quality to be controlled around the mobile terminal 201 can be changed by changing the power intensity of the response request signal (radio signal) transmitted from the mobile terminal 201.

In FIGS. 2 and 3, the arrow indicated by solid lines shows that the transmitter transmits a signal and the receiver can receive the transmission signal, and the arrow indicated by dotted lines shows the transmitter transmits a signal but the receiver cannot receive the transmission signal.

Next, the operation of the communication restriction control is explained below.

Figure 7:
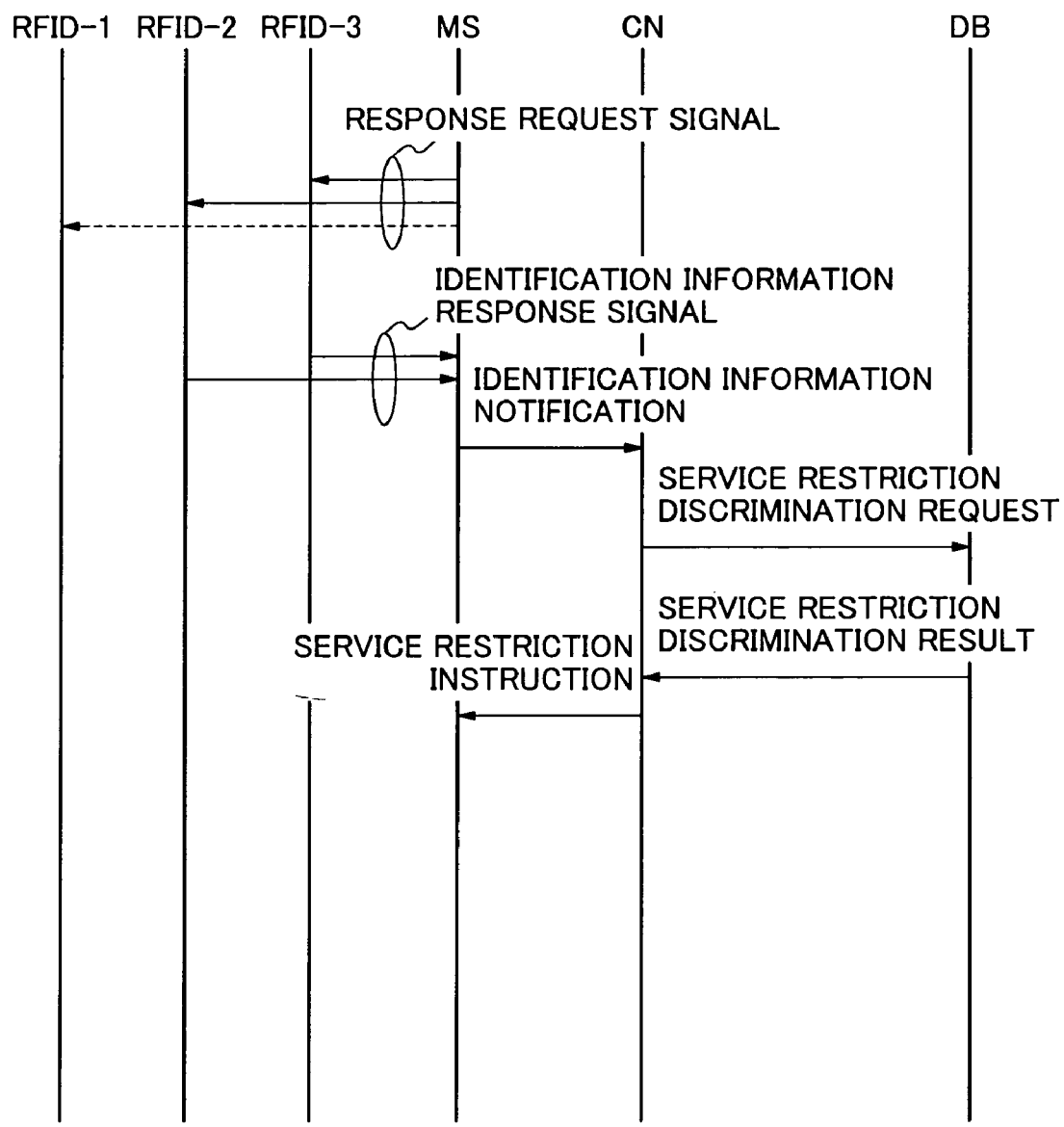
FIG. 7 is a signal sequence chart showing the restriction control operation performed by the communication restriction control system according to the first embodiment of the present invention shown in FIG. 1.

FIG. 7 shows the signal sequence for explanation of the restriction control operation performed by the communication restriction control system shown in FIG. 1. In FIG. 7, radio response equipments RFID-1 to RFID-3 are fixed type or non-fixed type radio response equipments. Reference numerals MS, CN, and DB respectively designate a mobile terminal, a core equipment, and a communication system discriminating equipment.

The mobile terminal MS transmits a response request signal to the radio response equipments RFID-1 to RFID-3 scattered in the vicinity when the execution of a service starts. In this example, it is assumed that the radio response equipment RFID-2 and the radio response equipment RFID-3 in the radio response equipments RFID-1 to RFID-3 are located in the position in which the radio communication can be performed with the mobile terminal MS, and the radio response equipment RFID-1 is located in the position in which the radio communication cannot be performed with the mobile terminal MS.

When each of the radio response equipments RFID-2 and RFID-3 receives the response request signal from the mobile terminal MS, each of them returns the response signal including the radio response equipment identification information of the corresponding equipment to the mobile terminal MS. Since the response request signal from the mobile terminal MS does not reach the radio response equipment RFID-1, the radio response equipment RFID-1 does not return the response signal to the mobile terminal MS. In FIG. 7, the response request signal indicated by the arrow of solid lines shows that a signal has correctly reached the equipment pointed to by the arrow, and the response request signal indicated by the arrow of dotted lines shows that a signal has not correctly reached the equipment pointed to by the arrow. Whether or not the response request signal correctly reaches depends on the distance between the mobile terminal MS and each of the radio response equipments RFID-1 to RFID-3. Based on this, the radio response equipment near the mobile terminal MS can be specified.

When the mobile terminal MS receives the response signal from the radio response equipments RFID-2 and RFID-3, they extract the radio response equipment identification information included in the response signal, and notify the core equipment CN of the extracted information (identification information notification). Upon receipt of the notification of the radio response equipment identification information, the core equipment CN transmits the service restriction discrimination request signal which includes the radio response equipment identification information to the communication system discriminating equipment DB.

The communication system discriminating equipment DB recognizes the geographical location of the mobile terminal MS and the entity (practically an object or a person to which the radio response equipment is attached) near the location based on the radio response equipment identification information included in the service restriction discrimination request signal received from the core equipment CN. The communication system discriminating equipment DB performs a determination as to what is an allowable communication system, whether or not a service desired by a mobile terminal user can be executed, what is an executable service, etc. in the spatial position of the mobile terminal MS according to the information (stored as associated with the radio response equipment identification information) about each item stored in advance in a database, and the radio response equipment identification information included in the service restriction discrimination request signal. Then, the communication system discriminating equipment DB returns the service restriction determination result to the core equipment CN.

Upon receipt of the service restriction determination result from the communication system discriminating equipment DB, the core equipment CN notifies the mobile terminal MS of the information such as an executable communication system, communication quality, service restriction, etc. (service restriction instruction). The mobile terminal MS follows the contents of the service restriction instruction. For example, when the communication system is specified, only a mobile terminal using the specified communication system can be enabled for communications. When the communication quality is specified, a mobile terminal is permitted for the communications in the specified communication quality. When a service is specified, a mobile terminal is permitted for the communications in the specified service.

In the above-mentioned operation of the communication restriction control, by registering the radio response equipment identification information in the database of the communication system discriminating equipment as associated with the contents of desired communication restriction control, the communication restriction control contents registered in the database can be executed on the mobile terminal locating in the predetermined range of the communication distance from the radio response equipment. Thus, the communication restriction control of a mobile terminal can be performed depending on the circumstances. For example, when a communication system (e.g., radio access system or signal modulation system) is restricted in a desired place (or space), the radio response equipment identification information is registered in a database as associated with an allowable communication system around the radio response equipment. Thus, a mobile terminal located in the range of the radio communication with the radio response equipment is permitted for the communication if it is operated by the communication system registered in the database. Since the communication distance of the radio response equipment is short, for example, several meters, etc., an area of a desired shape can be easily formed by providing plural radio response equipments.

Although the above-mentioned communication restriction control can be applied to various situations, the operation depends on each situation. Described below can be the operation in a practical situation.

(1) The operation performed when a user carrying a mobile terminal travels on foot or drives a car, etc. is described below.

Figure 4:
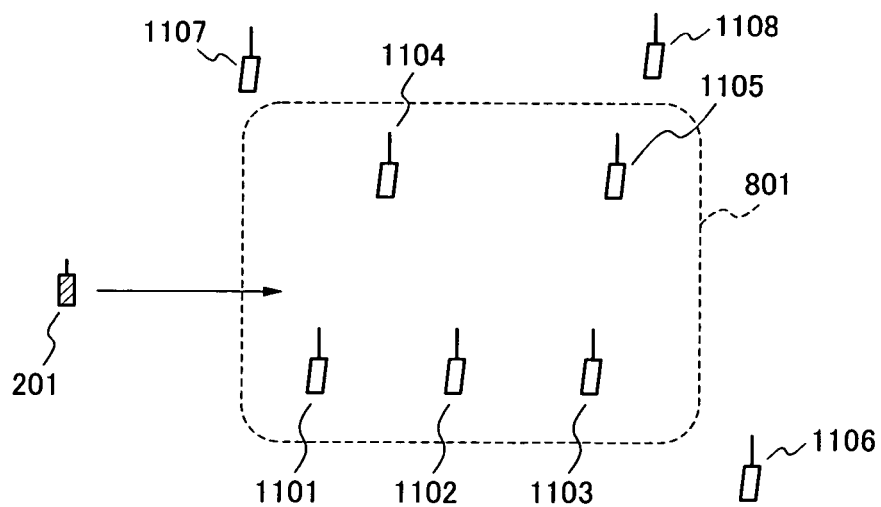
FIG. 4 is a schematic drawing showing the concept of the relationship between the moving situation of a mobile terminal and the communication restriction control area.

FIG. 4 shows the concept of the relationship between the moving situation of a mobile terminal and the communication restriction control area. In FIG. 4, the fixed type radio response equipments 1101 to 1105 are arranged in the communication restriction control area 801, and the fixed type radio response equipments 1106 to 1108 are arranged around the communication restriction control area 801.

The communication restriction control applied to the mobile terminal 201 depends on the inside or outside the communication restriction control area 801. When the mobile terminal 201 moves from the outside of the communication restriction control area 801 to the inside of the communication restriction control area 801, the communication restriction control applied to the mobile terminal 201 is changed with the movement of the mobile terminal 201.

The mobile terminal 201 transmits a response request signal at predetermined time intervals such that the radio response equipment identification information can be acquired from a fixed type or non-fixed type radio response equipment in the vicinity. The details are described below by referring to FIGS. 4 and 1.

When the mobile terminal 201 moves to the communication restriction control area 801, at least one of the fixed type radio response equipments 1101 to 1105 transmits a response signal including the radio response equipment identification information of the corresponding equipment to the mobile terminal 201 according to the response request signal from the mobile terminal 201. Upon receipt of the response signal, the mobile terminal 201 provides the radio response equipment identification information included in the response request signal to the communication system discriminating equipment 501 through the radio base station 301 and the core equipment 401.

The communication system discriminating equipment 501 determines the communication system for the communication restriction control to the mobile terminal 201 by retrieving the database using a retrieval key of the radio response equipment identification information provided by the mobile terminal 201, and returns the determination result to the core equipment 401. The core equipment 401 assigns the communication system to be controlled to the mobile terminal 201 based on the determination result from the communication system discriminating equipment 501. The mobile terminal 201 performs a communication by allowed communication system or a service based on the service quality/service grade according to the assignment by the core equipment 401.

Then, the mobile terminal 201 moves from the inside of the communication restriction control area 801 to the outside of the communication restriction control area 801, the mobile terminal 201 receives the radio response equipment identification information from the fixed type radio response equipment (for example, the fixed type radio response equipments 1106 to 1108) arranged outside the communication restriction control area 801. Thus, the communication restriction control is performed for the mobile terminal 201 based on the received radio response equipment identification information arranged near the mobile station 201.

(2) Next, the operation performed when a moving object attached with a non-fixed type radio response equipment (or a person carrying a non-fixed type radio response equipment) is approaching a user carrying a mobile terminal is explained below.

Figure 5:
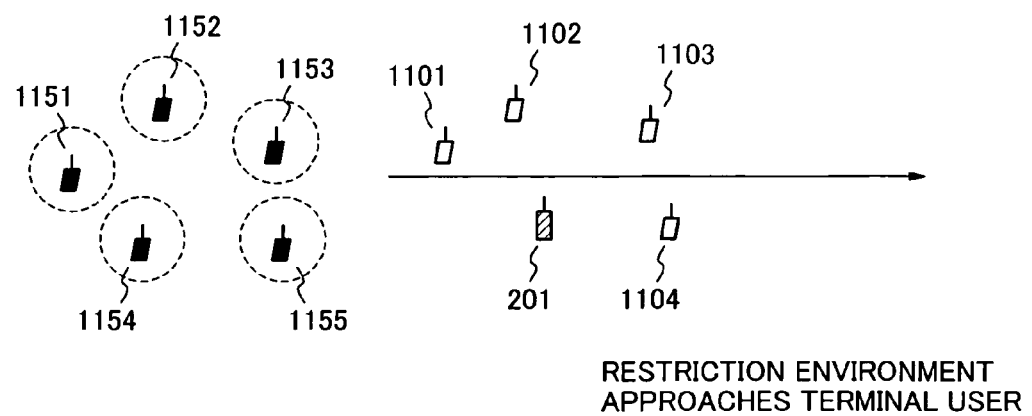
FIG. 5 is a schematic drawing showing the state when the environments with non-fixed type radio response equipment are approaching a mobile terminal and restriction control state is changed.

FIG. 5 is a schematic drawing showing the state when the environments with non-fixed type radio response equipments are approaching a mobile terminal and restriction control state is changed. For example, the environment can be a case where an electronic equipment device (electronic equipment capable of generating a fault such as a malfunction by electromagnetic energy, etc.) sensitive to electromagnetic energy by the radiation of an electromagnetic wave of a mobile terminal is approaching the mobile terminal.

In FIG. 5, the fixed type radio response equipments 1101 to 1104 are arranged around the mobile terminal 201. In this state, the mobile terminal 201 provides the radio response equipment identification information received from at least one of the fixed type radio response equipments 1101 to 1104 to the communication system discriminating equipment (501 shown in FIG. 1). Then, the communication system discriminating equipment 501 determines the communication system according to the radio response equipment identification information, and the core equipment (401 shown in FIG. 1) assigns the determined communication system to the mobile terminal 201.

In the above-mentioned status, when the non-fixed type radio response equipments 1151 to 1155 located at the place distant from the mobile terminal 201 are approaching the mobile terminal 201, the response request signal transmitted from the mobile terminal 201 at a predetermined time intervals is received by at least one of the non-fixed type radio response equipments 1151 to 1155. The response request signal is also received by the fixed type radio response equipment located around the mobile terminal 201.

The fixed type and non-fixed type radio response equipments which have received the response request signal transmit the response signal including the radio response equipment identification information to the mobile terminal 201. The mobile terminal 201 provides the radio response equipment identification information included in each response signal received from the fixed type and non-fixed type radio response equipments to the communication system discriminating equipment 501. The communication system discriminating equipment 501 discriminates the communication system allowable by the mobile terminal 201 according to the radio response equipment identification information provided by the mobile terminal 201. In discriminating the communication system, the communication system discriminating equipment 501 prioritizes the discrimination according to the radio response equipment identification information from the non-fixed type radio response equipment. Thus, the discriminated communication system is provided to the core equipment 401, and the communication to be allowed by the mobile terminal 201 is controlled depending on the discriminated communication system.

The priority control in discriminating the communication system can be realized by, for example, storing the information indicating the priority of discrimination together with the radio response equipment identification information in the database 502 of the communication system discriminating equipment 501.

(3) Next, the case where the restriction status in the communication restriction control area varies in accordance with a time period is explained below.

Figure 6:
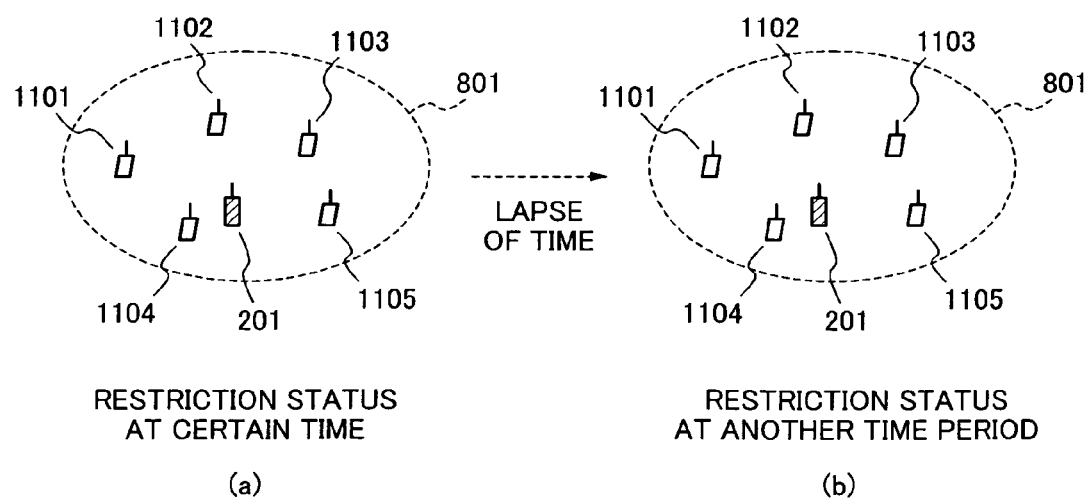
FIG. 6 is a schematic drawing showing a certain area in which the restriction control state is altered depending on time period.

FIG. 6 is the schematic drawing showing a certain area in which the restriction control state is altered depending on each time period. In FIG. 6, (a) indicates the restriction status in a certain time period in the communication restriction control area 801, and (b) indicates the restriction status in the same communication restriction control area 801 but in a different time period from the status indicated by (a).

Any of the statuses of (a) and (b) shown in FIG. 6 shows the arrangement of the fixed type radio response equipments 1101 to 1105 in the communication restriction control area 801, and the mobile terminal 201 is located in the communication restriction control area 801.

The mobile terminal 201 transmits the response request signal to the fixed type radio response equipments 1101 to 1105 around the mobile terminal 201 when the communication starts. At least one of the fixed type radio response equipments 1101 to 1105 receives the response request signal from the mobile terminal 201, and transmits the response signal including the radio response equipment identification information to the mobile terminal 201. Upon receipt of the response signal, the mobile terminal 201 transfers the radio response equipment identification information included in the received response signal to the communication system discriminating equipment (501 shown in FIG. 1). The communication system discriminating equipment 501 discriminates the communication system for the communication restriction control in the area 801 according to the radio response equipment identification information provided by the mobile terminal 201. The database 502 of the communication system discriminating equipment 501 stores the radio response equipment identification information associated with an allowable communication system by time period. The communication system discriminating equipment 501 acquires the current time from the clock unit 503, which has a function of providing the current time, installed in the own equipment, and determines the communication system allowed in the area 801 by referring to the time and the database 502 according to the radio response equipment identification information provided by the mobile terminal 201.

At the same place in the time period different from the period described above, the mobile terminal 201 receives the response signal including the radio response equipment identification information from at least one of the fixed type radio response equipments 1101 to 1105, and transfers the radio response equipment identification information included in the response signal to the communication system discriminating equipment 501. The communication system discriminating equipment 501 refers to the database 502 according to the radio response equipment identification information provided by the mobile terminal 201 and the current time, and determines the communication system allowed in the area 801 at the current time.

According to the discrimination of the communication system, a different communication system can be assigned at the same place by time period. Similarly, the communication quality and a service can be assigned by time period. For example, if the execution of a service is restricted in a time period in which a performance or a play is acted, then a mobile terminal cannot execute the service in the time period.

The above-mentioned communication restriction control can be applied to a state in which a use of a mobile terminal is disabled when there is a person carrying electronic equipment (or a person with implanted electronic equipment), and otherwise the use of a mobile terminal is enabled. The communication restriction control according to the present embodiment can also be applied by prohibiting the use of a mobile terminal in a concert hall, a theater, etc. in a time period when a performance or a play is acted, and permitting the use of a mobile terminal in the other time periods. The communication restriction control according to the present embodiment can be applied by prohibiting the use of a mobile terminal in the time period in which an electronic device sensitive to electromagnetic radiation is operating, and permitting the use of the mobile terminal in the other time periods.

(4) Next described is the operation for performing the communication restriction control determined by the positional relationship among plural fixed type radio response equipments and the mobile terminal.

Figure 8:
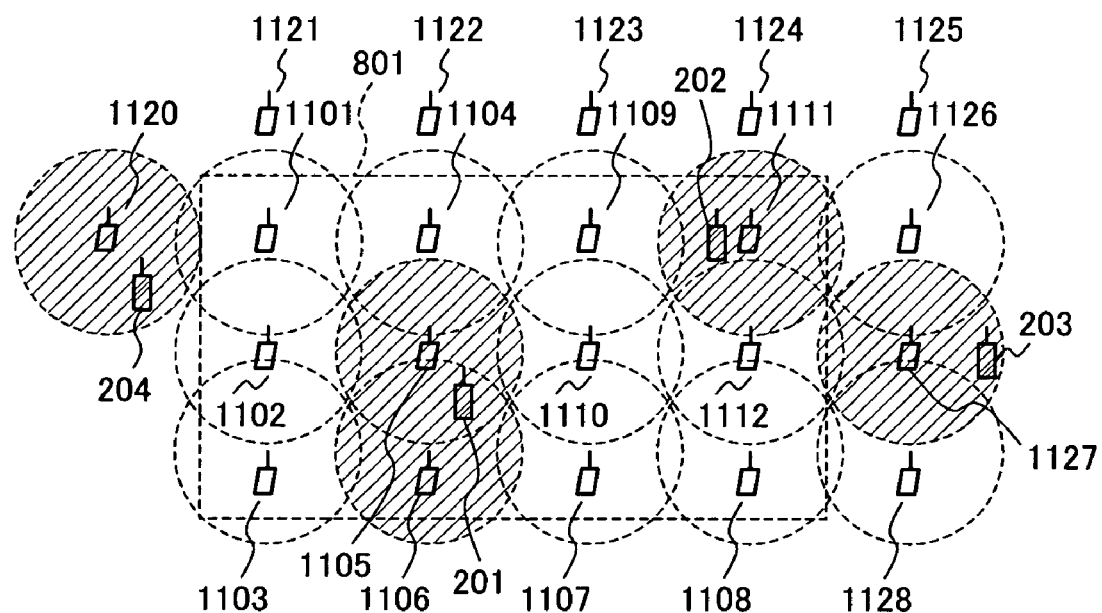
FIG. 8 is a schematic drawing showing an arrangement example of the radio response equipments in the communication restriction control area.

FIG. 8 is a schematic drawing showing an arrangement example of the radio response equipments in the communication restriction control area. In FIG. 8, the fixed type radio response equipments 1101 to 1112 are evenly arranged in the communication restriction control area 801, and the mobile terminal can perform radio communication with at least one of the fixed type radio response equipments 1101 to 1112 in any position in the communication restriction control area 801. Outside the communication restriction control area 801, the fixed type radio response equipments 1120 to 1128 are arranged. In the database of the communication system discriminating equipment (501 shown in FIG. 1), the information about the positional relationship between the fixed type radio response equipments 1101 to 1112 and 1120 to 1128 and the communication system restriction areas 801 (the information about the fixed type radio response equipment forming part of the communication restriction control area and the information about the other fixed type radio response equipments) is stored as associated with the corresponding radio response equipment identification information, and the contents of a controlled communication system in the communication restriction control area 801 are stored.

The mobile terminal 201 in the communication restriction control area 801 is located at a distance where radio communication with the fixed type radio response equipments 1105 and 1106 is enabled, but is located at a distance where radio communication cannot be performed with other fixed type radio response equipments. In this case, the mobile terminal 201 receives the response signals from the fixed type radio response equipments 1105 and 1106, and transfers the radio response equipment identification information included in the received response signals to the communication system discriminating equipment 501.

The communication system discriminating equipment 501 refers to the database 502 according to the radio response equipment identification information provided by the mobile terminal 201, and determines whether or not the mobile terminal 201 is located in the communication restriction control area 801. In this case, since the radio response equipment identification information from the mobile terminal 201 is the radio response equipment identification information of the fixed type radio response equipments 1105 and 1106 located in the communication restriction control area 801, the communication system discriminating equipment 501 determines that the mobile terminal 201 is located in the communication restriction control area 801, and transmits the communication system allowed in the communication restriction control area 801 registered in the database 502 to the core equipment (401 shown in FIG. 1). The core equipment 401 performs communication restriction control of the mobile terminal 201 by the communication system provided by the communication system discriminating equipment 501.

The mobile terminal 202 in the communication restriction control area 801 is located at the distance where the radio communication can be performed with the fixed type radio response equipment 1111, but is located at the distance where radio communication cannot be performed with the other fixed type radio response equipments. In this case, the mobile terminal 202 receives the response signal from the fixed type radio response equipment 1111, and transfers the radio response equipment identification information included in the received response signal to the communication system discriminating equipment 501.

The communication system discriminating equipment 501 refers to the database 502 according to the radio response equipment identification information provided by the mobile terminal 202, and determines whether or not the mobile terminal 202 is located in the communication restriction control area 801. In this case, since the radio response equipment identification information from the mobile terminal 202 is the radio response equipment identification information of the fixed type radio response equipment 1111 located in the communication restriction control area 801, the communication system discriminating equipment 501 determines that the mobile terminal 202 is in the communication restriction control area 801, and the communication system allowed in the communication restriction control area 801 registered in the database 502 is transmitted to the core equipment 401. The core equipment 401 performs the communication restriction control of the mobile terminal 202 by the communication system provided from the communication system discriminating equipment 501.

The mobile terminal 203 outside the communication restriction control area 801 is located at the distance where the radio communication can be performed with the fixed type radio response equipment 1127, but is located at a distance where radio communication cannot be performed with the other fixed type radio response equipments. In this case, the mobile terminal 203 receives the response signal from the fixed type radio response equipment 1127, and transfers the radio response equipment identification information included in the received response signal to the communication system discriminating equipment 501.

The communication system discriminating equipment 501 refers to the database 502 according to the radio response equipment identification information provided by the mobile terminal 203, and determines whether or not the mobile terminal 203 is located in the communication restriction control area 801. In this case, since the radio response equipment identification information from the mobile terminal 203 is the radio response equipment identification information of the fixed type radio response equipment 1127 placed outside the communication restriction control area 801, the communication system discriminating equipment 501 determines that the mobile terminal 203 is not located in the communication restriction control area 801, and does not provide a communication system information for the communication restriction control to the core equipment 401. Thus, the mobile terminal 203 does not receive any restriction information of the communication system to be controlled in the communication restriction control area 801.

The mobile terminal 204 outside the communication restriction control area 801 is located at a distance where the radio communication can be performed with the fixed type radio response equipment 1120, but is located at a distance where the radio communication cannot be performed with the other fixed type radio response equipments. In this case, the mobile terminal 204 receives the response signal from the fixed type radio response equipment 1127, and transfers the radio response equipment identification information included in the received response signal to the communication system discriminating equipment 501.

The communication system discriminating equipment 501 refers to the database 502 according to the radio response equipment identification information provided by the mobile terminal 204, and determines whether or not the mobile terminal 204 is located inside the communication restriction control area 801. In this case, since the radio response equipment identification information from the mobile terminal 204 is the radio response equipment identification information of the fixed type radio response equipment 1120 placed outside the communication restriction control area 801, the communication system discriminating equipment 501 determines that the mobile terminal 204 is not located inside the communication restriction control area 801, and does not provide a communication system information for the communication restriction control to the core equipment 401. Thus, the mobile terminal 204 does not receive any restriction information of the communication system to be controlled in the communication restriction control area 801.

In the vicinity of the communication restriction control area 801, a radio signal from the fixed type radio response equipment placed inside of the communication restriction control area 801 reaches the outside of the area. However, in the arrangement shown in FIG. 8, a radio signal from the fixed type radio response equipment placed outside the communication restriction control area 801 does not reach the inside of the area. Therefore, when the radio response equipment identification information of the fixed type radio response equipment placed outside the communication restriction control area 801 is included in the radio response equipment identification information provided by a mobile terminal, the communication system discriminating equipment 501 determines that the mobile terminal is located outside the communication restriction control area 801.

In the arrangement shown in FIG. 8, by registering the positional relationship between the fixed type radio response equipment and the communication restriction control area (the information about the fixed type radio response equipment forming a communication restriction control area 801 and the information about the other fixed type radio response equipments) in the database of the communication system discriminating equipment 501, an arbitrary fixed type radio response equipment can form a communication restriction control area as required.

Figure 9:
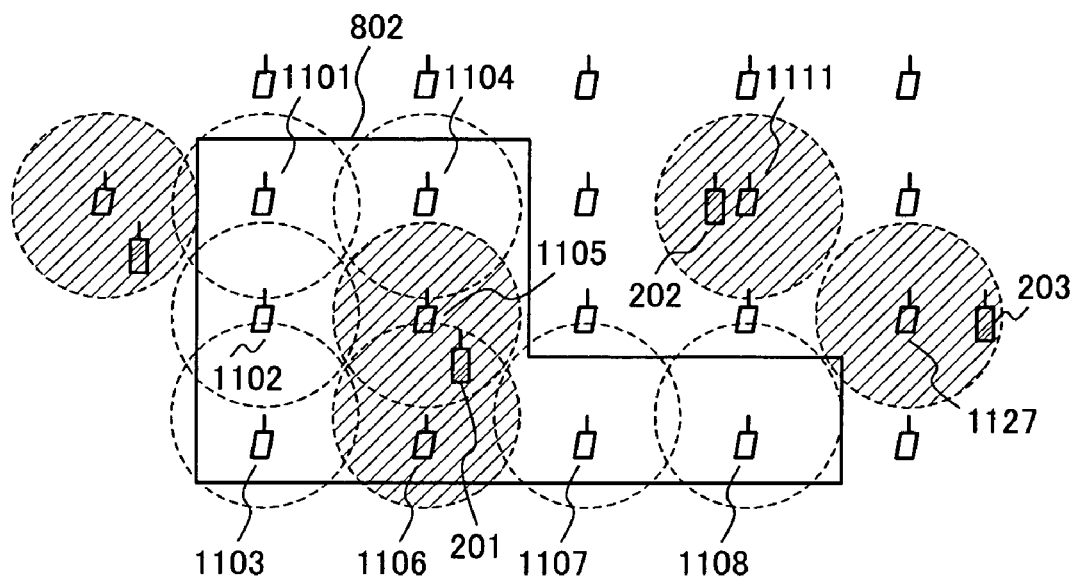
FIG. 9 is a schematic drawing showing another arrangement example of the radio response equipment in the communication restriction control area.

FIG. 9 shows a communication restriction control area 802 which has a different shape of area from the communication restriction control area 801 shown in FIG. 8. Referring to FIG. 9, the fixed type radio response equipments 1101 to 1108 form the communication restriction control area 802. The other fixed type radio response equipments are placed outside the communication restriction control area 802. The database of the communication system discriminating equipment 501 (shown in FIG. 1) stores the radio response equipment identification information of the fixed type radio response equipments 1101 to 1108 as the information forming the communication restriction control area 802, and stores the radio response equipment identification information of the other fixed type radio response equipments as the information about the radio response equipment placed outside the communication restriction control area 802. Additionally, the database stores the contents of the allowable communication system in the communication restriction control area 802.

The mobile terminal 201 in the communication restriction control area 801 is located at a distance where the radio communication can be performed with the fixed type radio response equipments 1105 and 1106, but is located at a distance where the radio communication cannot be performed with the other fixed type radio response equipments. In this case, the mobile terminal 201 receives the response signal from the fixed type radio response equipments 1105 and 1106, and transfers the radio response equipment identification information included in the received response signal to the communication system discriminating equipment 501.

The communication system discriminating equipment 501 refers to the database 502 according to the radio response equipment identification information provided by the mobile terminal 201, and determines whether or not the mobile terminal 201 is located in the communication restriction control area 802. In this case, since the radio response equipment identification information from the mobile terminal 201 is the radio response equipment identification information of the fixed type radio response equipments 1105 and 1106 placed in the communication restriction control area 802, the communication system discriminating equipment 501 determines that the mobile terminal 201 is located inside the communication restriction control area 802, and transmits an allowable communication system information in the communication restriction control area 802 registered in the database 502 to the core equipment 401 (shown in FIG. 1). The core equipment 401 performs communication restriction control of the mobile terminal 201 by the communication system information provided from the communication system discriminating equipment 501.

The mobile terminal 202 outside the communication restriction control area 802 is located at a distance where radio communication can be performed with the fixed type radio response equipment 1111, but is located at a distance where radio communication cannot be performed with the other fixed type radio response equipments. In this case, the mobile terminal 202 receives the response signal from the fixed type radio response equipment 1111, and transfers the radio response equipment identification information included in the received response signal to the communication system discriminating equipment 501.

The communication system discriminating equipment 501 refers to the database 502 according to the radio response equipment identification information provided by the mobile terminal 202, and determines whether or not the mobile terminal 202 is located in the communication restriction control area 802. In this case, since the radio response equipment identification information from the mobile terminal 202 is the radio response equipment identification information of the fixed type radio response equipment 1111 placed outside the communication restriction control area 801, the communication system discriminating equipment 501 determines that the mobile terminal 202 is not located in the communication restriction control area 802, and does not provide a communication system information for the communication restriction control to the core equipment 401. Thus, the mobile terminal 202 does not receive any restriction information of the communication system to be controlled in the communication restriction control area 802.

The communication restriction control areas 801 and 802 shown in FIGS. 8 and 9 can be communication restriction control areas to be controlled in the different time periods in the same place.

The communication system determined by the communication system discriminating equipment is to be restricted, or to be allowed in the communication restriction control areas 801 and 802 depending on the situation. The arrangement positions and the number of the radio response equipments shown in FIGS. 8 and 9 are only examples, and other arrangements and numbers can also be specified. The radio communication distance of the radio response equipment can be variable. In FIGS. 8 and 9, the reach range of the radio response equipment is expressed by a planar circular shape for the sake of simplicity, but is a practically three-dimensional sphere.

Next, the data structure stored in the database 502 of the communication system discriminating equipment 501 (shown in FIG. 1) is explained in the case where the shape of the communication restriction control area is changed.

Figures 10A, 10B, 10C:
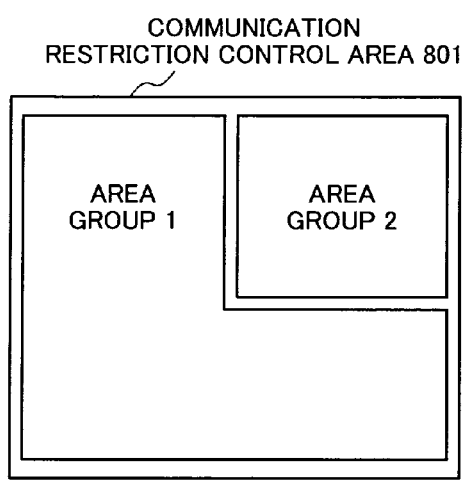
FIGS. 10A, 10B, and 10C show the data structure of a database.

FIGS. 10A to 10C show the data structure of the database when the communication restriction control area 801 shown in FIG. 8 is further divided into two restricted areas. FIG. 10A shows the arrangement status of the radio response equipment in the communication restriction control area, FIG. 10B shows the first table storing each area group, which is corresponding to respective divided communication restriction control areas, associated with the radio response equipment identification information (ID number) of the radio response equipment, and FIG. 10C shows the second table storing the types of area group associated with the types of service group.

In the arrangement status shown in FIG. 10A, the communication restriction control area 801 is divided into the area groups 1 and 2. The communication restriction control is performed in each of area groups 1 and 2. The communication restriction control in the area groups 1 and 2 can be performed indifferent time periods. By referring to the first table shown in FIG. 10B, the fixed type radio response equipments forming each of the area groups 1 and 2 can be determined according to the radio response equipment identification information (ID number) of the fixed type radio response equipment arranged in the communication restriction control area 801. By referring to the second table shown in FIG. 10C, a service group allowed in each of the area groups 1 and 2 can be determined.

The communication system discriminating equipment 501 (shown in FIG. 1) refers to the first table, and determines the area group 1 or 2, in which the mobile terminal is located, according to the radio response equipment identification information transferred by the mobile terminal. Then, the communication system discriminating equipment 501 determines the allowable service in the determined area group by referring to the second table.

In this example, the communication restriction control area 801 indicates the floor portion of a building, and each area group indicates a temporarily separated place of the floor by a partitioning wall or a partition. In a time period, the communication restriction control area 801 is sectioned into the area groups 1 and 2 as shown in FIG. 10A. In the floor as the communication restriction control area 801, plural radio response equipments are placed or attached to the floor, ceiling, or desk, etc. as shown in FIG. 8.

FIGS. 11A to 11C show the arrangement status of a communication restriction control area 801 at a time different from the time in the example shown in FIGS. 10A to 10C and the data structure of the database. FIG. 11A shows the arrangement status of the radio response equipment, FIG. 11B shows the first table storing the area group, which is corresponding to respective divided communication restriction control areas, associated with the radio response equipment identification information (ID number) of the radio response equipment, and FIG. 11C shows the second table storing the types of area group associated with the types of service group.

In the examples shown in FIGS. 11A to 11C, the relationship between the sizes of the area groups 1 and 2 is different from that in the examples shown in FIGS. 10A to 10C. In this case, the fixed type radio response equipment forming each of the area groups 1 and 2 can be determined according to the radio response equipment identification information (ID number) of the fixed type radio response equipment arranged in the communication restriction control area 801 by referring to the first table shown in FIG. 11B. The allowable service group in each of the area groups 1 and 2 can be determined by referring to the second table shown in FIG. 11C.

The communication system discriminating equipment 501 refers to the first table, and determines the area group 1 or 2, in which the mobile terminal is located, according to the radio response equipment identification information transferred by the mobile terminal. Then, the communication system discriminating equipment 501 determines an allowable service in the determined area group by referring to the second table.

In a time period, the arrangement status shown in FIG. 10A is determined, and in another time period, the arrangement status shown in FIG. 11A is determined. The change from the arrangement status shown in FIG. 10A to the arrangement status shown in FIG. 11A can be easily realized by rewriting the contents of the first and second tables.

The communication restriction control shown in FIGS. 10A to 10C and 11A to 11C can be applied when, for example, a conference of a group in a room is over, and then another group changes the size and the shape of the room. It also can be applied when a communication system allowed or a service allowed in a train at a certain time point is changed, for example, an allowed service by a mobile terminal in a train can be changed between the case where the train is running in a metropolis and the case where the train is running in the suburbs.

FIGS. 12A, 12B, 13A, 13B, 14, 15A, and 15B show the practical contents of the first and second tables shown in FIGS. 10B, 10C, 11B, and 11C.

Figures 12A, 12B:
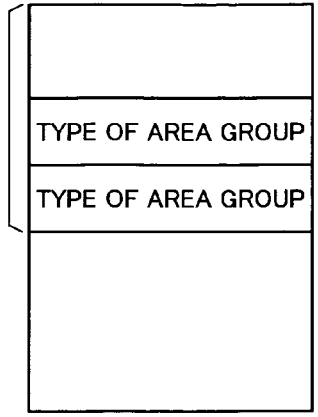
FIGS. 12A and 12B show another data structure of a database.

The first table shown in FIG. 12A stores the radio response equipment identification information associated with the area group type, and the second table shown in FIG. 12B stores the area group type associated with the communication system/service type allowed in the area group. By referring to the first and second tables, an area group in which the radio response equipment belongs is specified, and the allowable communication system or service in the area group is specified.

When there are plural allowable communication systems or services for each area group, an additional stage of a table link can be provided for storage of them. In this case, the contents of the second table can include an index number of the type of a communication system or a service for indexing plural communication systems or services.

Figures 13A, 13B:
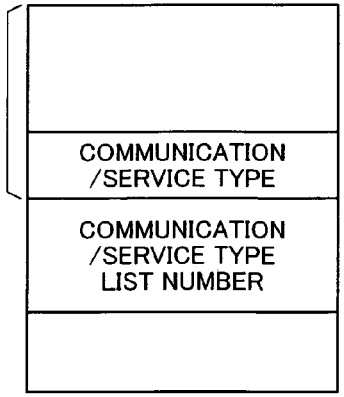
FIGS. 13A and 13B show another data structure of a database.

FIGS. 13A and 13B show the case where the second table shown in FIG. 12B includes the index number of the type of a communication system or a service. The table shown in FIG. 13A stores the index number of the type of a communication system or a service associated with the list number of the type of the communication system or the service. The table shown in FIG. 13B stores the service type associated with the list of types of a communication system or a service. By referring to these tables, a list number of the type of a communication system or a service is obtained by the index number of the type of a communication system or a service, and the type of a communication system or a service can be specified by the list number.

In FIGS. 12A, 12B, 13A, and 13B, the "communication/service type" refers to the allowable communication system or service to a mobile terminal user. An allowable service can be a service, for example, a telephone service, a mail service, a Web access, etc., permitted in a corresponding area group. An allowable communication system is a radio access system, such as the CDMA, TDMA, etc., for use between a mobile terminal and a radio base station.

FIG. 14 shows an example of a communication/service type. The table shown in FIG. 14 stores the communication/service type associated with the practical communication conditions of a service and a communication. A communication condition can be, for example, the maximum/average amount of transmission power, the continuity/intermittence of a transmission time, a modulation system (a radio access system), a frequency band, a service (voice/text), the maximum transmission speed, etc. By referring to the table, communication condition to be allowed for a mobile terminal in an area group can be specified.

In this example, a modulation system (a radio access system) can be, for example, the FDMA (Frequency Division Multiple Access), TDMA (Time Division Multiple Access), CDMA (Code Division Multiple Access), etc. The amount of transmission power refers to the intensity of radio wave from a mobile terminal, and it relates to the electromagnetic influence on electronic equipment around the mobile terminal. The amount of transmission power in the CDMA system relates to the transmission speed of the data to be transmitted because the transmission power depends on the diffusion rate.

The derived data transmission speed relates to the service type and the service quality for a mobile terminal user. For example, when a prescribed transmission speed is higher than the speed of the coded voice generated by a mobile terminal, a normal voice communication is permitted. However, when it is lower, the voice of the mobile terminal user cannot be immediately transmitted, but is temporarily stored and then transmitted later at a desired data transmission speed. This means a change in service quality in the point of view of the real-time communication. In such a case, a user can perform a communication at a prescribed data transmission speed by giving up the voice communication and selecting means for transmission by text (derivation of service type).

The attribute of enabled/disabled intermittent transmission relates to whether or not the intermittent electromagnetic radiation generates electromagnetic wave energy in a pulse form, thereby causing a malfunction of electronic equipment, and is required because the time intervals relate to the operation characteristic of electronic equipment.

The conventional modulation system and the communication system of a mobile terminal have initially been a single system, but plural modulation systems have become possibly incorporated as a terminal mechanism. For example, a PHS (personal handy phone system) adopts a communication system called "TDMA (Time Division Multiple Access)", and the PDC (Personal Digital Cellular) system (as the second generation mobile system in Japan) is operated in the TDMA modulation system. They are operated in the same TDMA system, but are different in time parameter and configuration of up/down communication channels, etc. There is a mobile terminal in which these two communication systems are incorporated, and the terminal is called a "dual mode terminal" or a "multi-mode terminal". Although there are various combinations of communication systems for the dual mode terminal or the multi-mode terminal, for example, the TDMA system represented by a PHS, a second generation mobile system, etc., the CDMA system used for the third generation mobile system are used, and the OFDM (Orthogonal Frequency Division Multiplexing) or the CDMA is used for wireless LAN.

The important point of the communication system according to the present invention is how the transmission power energy radiated and the frequency band used, etc. of the mobile terminal affect the peripheral electronic equipment, and it relates to the difference in the narrow band system such as the FDMA, TDMA, etc., the broad band system such as the CDMA, etc., and the transmission power of the mobile terminal relating to the distance between the radio base station and the mobile terminal. The mobile terminal having the function of the dual mode or multi-mode can select an appropriate communication system depending on the peripheral situation, and a service which was uniquely restricted in the conventional technology can be allowed to use according to the advantage of the present invention.

FIGS. 15A and 15B show examples of tables storing the information about the attribute of non-fixed type radio response equipment. The first table in FIG. 15A shows the relationship between the radio response equipment identification information and the device type number. The second table in FIG. 15B shows the relationship between the device type number and each device (hearing aid, heart pacemaker, etc.). The second table also stores the information about the illness of a user of the non-fixed type radio response equipment. In the situation shown in FIG. 5, the communication system discriminating equipment 501 refers to the first and second tables to discriminate the communication system to be allowed or to be restricted by the mobile terminal located around the user of the non-fixed type radio response equipment.

(5) Described below is the case where plural radio response equipments are three-dimensionally arranged.

Figure 16:
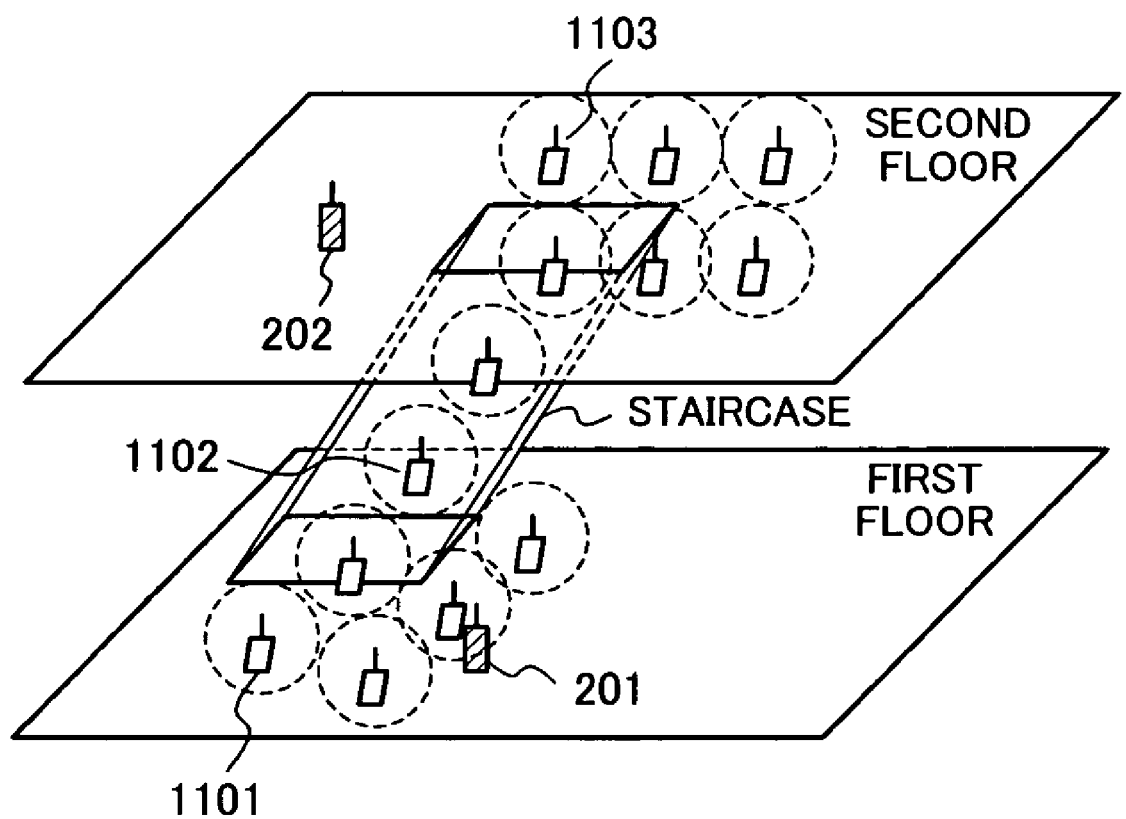
FIG. 16 is a schematic drawing showing the arrangement state of the radio response equipment when a part of the first floor, a part of the second floor, and the staircase portion are communication restriction control areas.

FIG. 16 is a schematic drawing showing the arrangement status of the radio response equipments when a part of the first floor, a part of the second floor, and the staircase portion are communication restriction control areas. Referring to FIG. 16, plural fixed type radio response equipments 1101 are arranged on a part of the floor or the wall on the first floor, plural fixed type radio response equipments 1102 are arranged at the staircase portion, and plural fixed type radio response equipments 1103 are arranged at a part of the floor or the wall on the second floor. The area in which the fixed type radio response equipments 1101 to 1103 are arranged is the communication restriction control area. The user, having the mobile terminals 201 or 202, moves between the first floor and the second floor through the communication restriction control area.

By registering the radio response equipment identification information of the fixed type radio response equipments 1101 to 1103 associated with the communication system (or the communication quality or the service) allowed in the communication restriction control area in the database of the communication system discriminating equipment 501 (shown in FIG. 1), the communication restriction control for the mobile terminals 201 and 202 can be performed in the communication restriction control area.

The communication restriction control area as shown in FIG. 16 can forme a more precise area shape than the shape of a restricted area in the conventional method formed by one or a small number of interference wave generating devices.

In addition, by registering different communication systems (or the communication quality or the service) by identification information of the fixed type radio response equipments 1101 to 1103 in the database, restriction control can be performed in different communication systems in each of a part of the first floor, a part of the second floor, and the staircase portion.

In the explanation above, the communication restriction control area is a spatially continuous area, but the present invention is not limited to such an area. That is, a communication restriction control area is provided for each of the fixed type radio response equipments 1101 to 1103, and each area can be spatially disconnected. In this case, the communication restriction control is performed in a narrower area (specific spot) on the floor. The communication restriction control in such a specific spot cannot be realized by the conventional method in which a small number of outgoing/incoming restriction radio base stations are arranged.

(6) Described below is the case where a communication restriction control area is formed in a moving object such as a train, etc.

Figure 17:
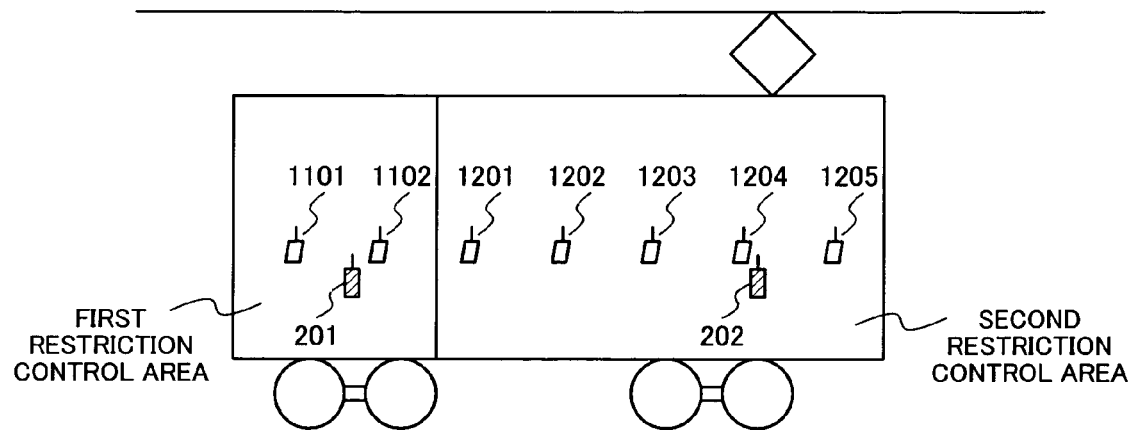
FIG. 17 is a schematic drawing showing the arrangement state of the fixed type radio response equipment when a communication restriction control area is provided in a train.

FIG. 17 is a schematic drawing of the arrangement status of the fixed type radio response equipments when a communication restriction control area is provided in a vehicle such as a train, etc. Referring to FIG. 17, it shows the first communication restriction control area formed by the fixed type radio response equipments 1101 and 1102, and the second communication restriction control area formed by the fixed type radio response equipments 1201 to 1205. The fixed type radio response equipments 1101, 1102, and 1201 to 1205 are placed or attached on the seats, poles, floors, ceilings, etc. in the vehicle.

The database 502 of the communication system discriminating equipment (501 shown in FIG. 1) stores each piece of identification information of the fixed type radio response equipments 1101 and 1102 associated with the contents of the communication system allowed in the first communication restriction control area, and each piece of the radio response equipment identification information of the fixed type radio response equipments 1201 to 1205 associated with the contents of the communication system allowed in the second communication restriction control area.

The mobile terminal 201 located in the first communication restriction control area transmits the response request signal to the fixed type radio response equipments 1101 and 1102 when the communication starts. Upon receipt of the response request signal from the mobile terminal 201, each of the fixed type radio response equipments 1101 and 1102 transmits the response signal including the radio response equipment identification information of the corresponding radio response equipment to the mobile terminal 201. Upon receipt of the response signal from the fixed type radio response equipments 1101 and 1102, the mobile terminal 201 provides the radio response equipment identification information included in the received response signal to the communication system discriminating equipment 501. The communication system discriminating equipment 501 discriminates the communication system allowed in the first communication restriction control area by referring to the database 502 according to the radio response equipment identification information provided by the mobile terminal 201, and provides the discrimination result to the core equipment (401 shown in FIG. 1). The core equipment 401 performs communication restriction control of the mobile terminal 201 based on the discrimination result from the communication system discriminating equipment 501.

As in the case described above, the mobile terminal 202 located in the second communication restriction control area acquires the radio response equipment identification information from at least one of the fixed type radio response equipments 1201 to 1205 at the start of its operation, and provides the radio response equipment identification information to the communication system discriminating equipment 501. The communication system discriminating equipment 501 discriminates the communication system allowed in the second communication restriction control area by referring to the database 502 according to the radio response equipment identification information provided by the mobile terminal 202, and provides the discrimination result to the core equipment 401. The core equipment 401 performs the communication restriction control of the mobile terminal 202 based on the discrimination result from the communication system discriminating equipment 501.

The communication system allowed in the first and second communication restriction control areas can be the same as or different from each other. The number of communication restriction control areas arranged in the vehicle can be 3 or more.

Figure 18:
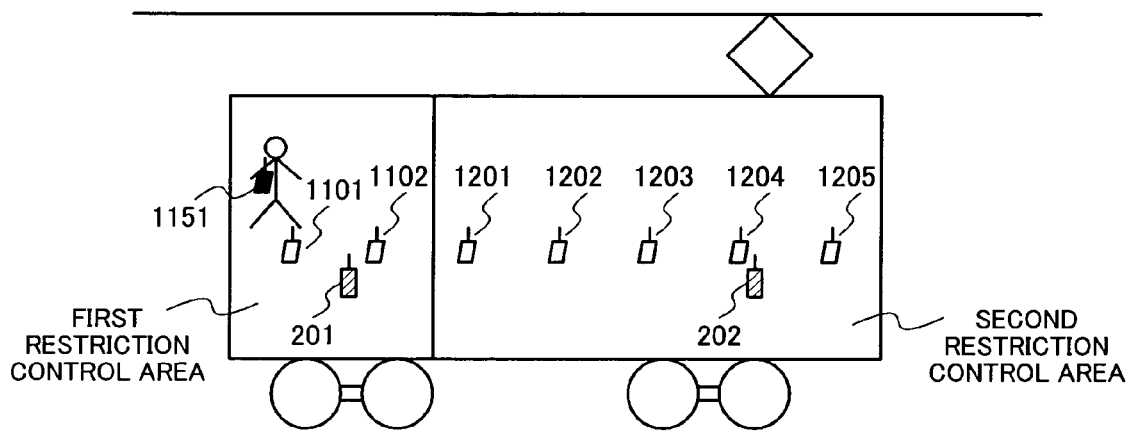
FIG. 18 is a schematic drawing showing the state when a non-fixed type radio response equipment is provided.

The example shown in FIG. 17 is the case where only the fixed type radio response equipments are present in the vehicle, but can be the case where there are non-fixed type radio response equipments. FIG. 18 is a schematic drawing of the state in which non-fixed type radio response equipments are present.

Referring to FIG. 18, the first and second communication restriction control areas are arranged in the vehicle, and there are a user having the mobile terminal 201 and a person having the non-fixed type radio response equipment 1151 (practically, a person having an implanted heart pacemaker or a person having an electronic hearing aid) in the first communication restriction control area. The database of the communication system discriminating equipment 501 stores the radio response equipment identification information of the non-fixed type radio response equipment 1151 associated with the contents of the communication system allowed around the non-fixed type radio response equipment 1151, and the stored communication restriction control information is specified to be prioritized over the other information about the communication restriction control.

Upon receipt of a response request signal from the mobile terminal 201, the non-fixed type radio response equipment 1151 provides a response signal including the radio response equipment identification information of the radio response equipment to the mobile terminal 201. Upon receipt of the response signal from the non-fixed type radio response equipment 1151, the mobile terminal 201 provides the radio response equipment identification information included in the received response signal to the communication system discriminating equipment 501. The communication system discriminating equipment 501 refers to the database according to the radio response equipment identification information provided by the mobile terminal 201 and discriminates a communication system to be controlled. In the discrimination, the communication system relating to the radio response equipment identification information of the prioritized non-fixed type radio response equipment 1151 is selected. The discrimination result is provided to the core equipment 401. The core equipment 401 performs communication restriction control of the mobile terminal 201 based on the discrimination result from the communication system discriminating equipment 501. In this operation, the mobile terminal located around the person having the non-fixed type radio response equipment 1151 is permitted to use only the communication system having no influence on a heart pacemaker or an electronic hearing aid. A mobile terminal in a system other than the permitted communication system cannot perform communications.

According to the arrangement status of the radio response equipments shown in FIG. 18, when there is no person subject to damage by the radiation of a radio wave, the communication system permitted in the first communication restriction control area can be executed. Thus, the situation, that the communication restriction control is performed except the communication system having no influence on a heart pacemaker and an electronic hearing aid although there is no person subject to damage by the radiation of a radio wave, can be avoided.

In the example shown in FIG. 18, the non-fixed type radio response equipment 1151 can be arranged not on a person, but on the place near the priority seats in the vehicle. In this case, the above-mentioned situation cannot be avoided, but the communication restriction control can be performed on the mobile terminal located near the priority seats. Therefore, a user of a heart pacemaker and an electronic hearing aid having no non-fixed type radio response equipment can be protected.

Furthermore, in the situation shown in FIG. 18, the communication system discriminating equipment 501 refers to the first and second tables shown in FIGS. 15A and 15B to discriminate the allowable communication system of the mobile terminal located near the user of the non-fixed type radio response equipment. Thus, appropriate restriction control can be performed when there is a person having electronic equipment sensitive to the radiation of electromagnetic energy near a predetermined position in a train, etc. Practically, when a user of a heart pacemaker has a non-fixed type radio response equipment 1151, the first and second tables shown in FIGS. 15A and 15B are generated according to the information about the operation condition, anti-noise property, etc. of the equipment obtained from the manufacturer of the heart pacemaker to calculate the radio wave intensity which causes a malfunction of the heart pacemaker. The discrimination of the communication system based on the tables is prioritized over the discrimination of the communication system by other tables (for example, the table shown in FIGS. 10B and 10C). Although it is determined according to the tables shown in FIGS. 10B and 10C that services are prohibited, the services can be permitted if it is discriminated according to the table search shown in FIGS. 15A and 15B that there are no users having electronic equipment sensitive to the radiation of electromagnetic energy in the vicinity.

(7) Described below is an example of an application in the facilities such as a concert hall, a theater, etc.

Figure 19:
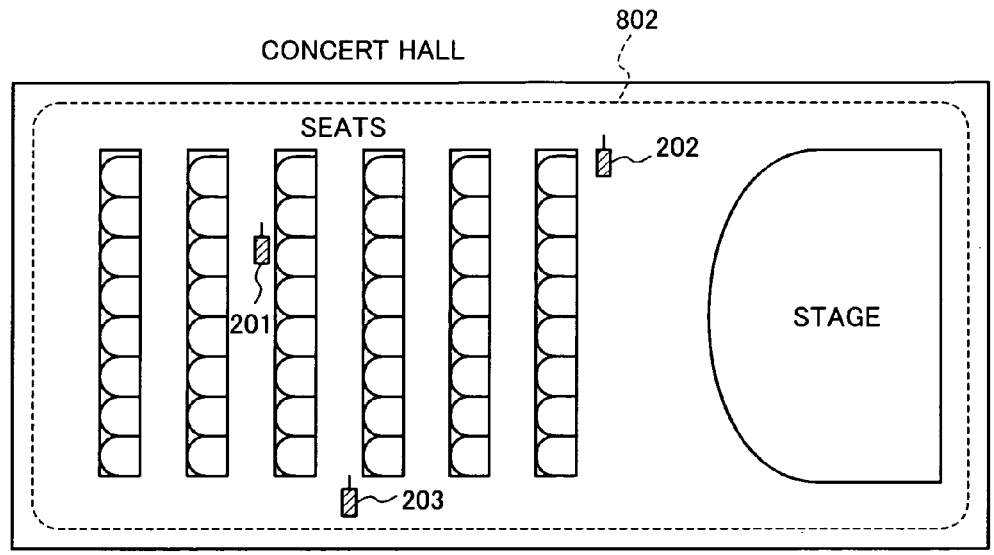
FIG. 19 is a schematic drawing showing an example of a concert hall.
Figure 20:
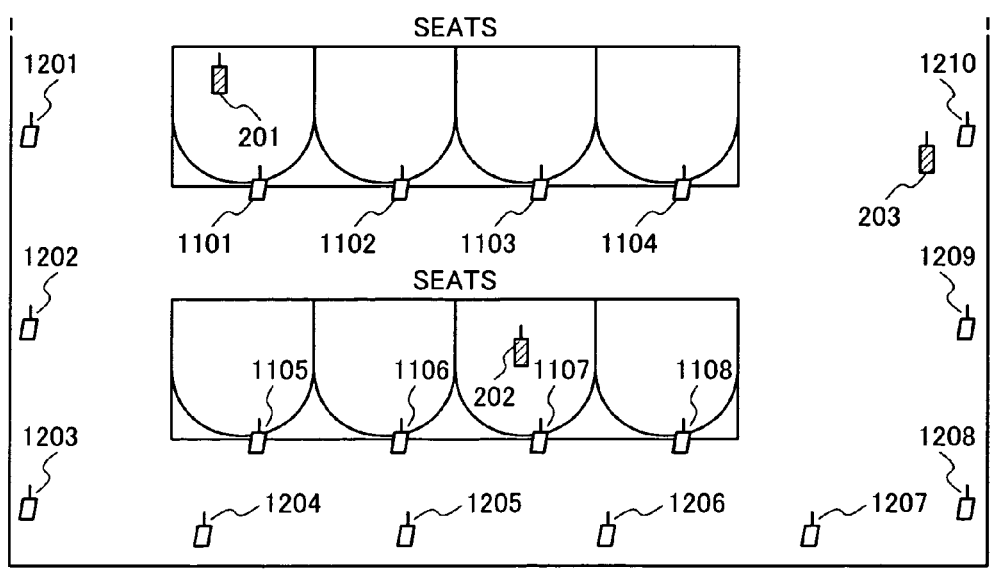
FIG. 20 is a schematic drawing showing the arrangement state of the fixed type radio response equipment in the concert hall shown in FIG. 19.

FIG. 19 shows an example of a concert hall, and FIG. 20 is a schematic drawing of the arrangement status of the fixed type radio response equipments in the facilities.

Referring to FIG. 19, a stage and plural seats are arranged in a concert hall. A communication system or a service is restricted on the mobile terminals 201 to 203 located in the concert hall. Practically, arrangements are made such that communication services cannot be provided only when a concert is being held. However, the mobile terminal is not communication-restricted outside the concert hall.

Referring to FIG. 20, the fixed type radio response equipments 1101 to 1108 are placed on each seat in the concert hall. Furthermore, the fixed type radio response equipments 1201 to 1210 are placed on the wall of the concert hall. The fixed type radio response equipments 1101 to 1104 are arranged on the forward seats, and the fixed type radio response equipments 1105 to 1108 are arranged on the backward seats.

The database 502 of the communication system discriminating equipment (501 shown in FIG. 1) stores each piece of identification information of the fixed type radio response equipments 1101 to 1108 and 1201 to 1210 associated with the information about the allowable communication system and the execution time period thereof in the concert hall.

Each of the mobile terminals 201 to 203 located in the concert hall transmits a response request signal at a predetermined time interval to the peripheral fixed type radio response equipments. Upon receipt of the response request signals from the mobile terminals 201 to 203, the fixed type radio response equipments around the mobile terminals 201 to 203 transmit a response signal including the radio response equipment identification information of the corresponding equipment to the mobile terminals 201 to 203.

Upon receipt of the response signals from the peripheral fixed type radio response equipments, each of the mobile terminals 201 to 203 provides the radio response equipment identification information included in the received response signal to the communication system discriminating equipment 501. The communication system discriminating equipment 501 discriminates the communication system by referring to the database 502 according to the radio response equipment identification information provided by the mobile terminals 201 to 203. In the discrimination of the communication system, the communication system discriminating equipment 501 first acquires the current time information using the clock unit 503 of the own equipment, and determines whether or not the current time refers to the specified time period registered in the database 502. Only when the current time refers to a specified time period, the registered communication system is provided to the core equipment (401 shown in FIG. 1). The core equipment 401 executes the communication restriction control of the mobile terminals 201 to 203 according to the communication system provided from the communication system discriminating equipment 501.

In the database, different communication systems can be registered for the radio response equipment identification information of the fixed type radio response equipments 1101 to 1104 arranged in the forward seats, the radio response equipment identification information of the fixed type radio response equipments 1105 to 1108 arranged in the backward seats, and the radio response equipment identification information of the fixed type radio response equipments 1201 to 1210 arranged on the wall of the concert hall. With the configuration, a different communication system can be prescribed for each row of seats, and a communication system allowed by each visitor in the standing room or a walking visitor can be prescribed.

When a person having a mobile terminal exits a hall, the mobile terminal can perform a normal communication service by performing a communication between the mobile terminal and the fixed type radio response equipment placed outside the hall.

The fixed type radio response equipments 1101 to 1108 placed on the seats can be placed by a manager/operator of the present communication restriction control system, or a manager/operator of the concert hall. If the latter case, a radio response equipment placed for the seat inducting system (system of inducting the seat of a visitor from the number of his or her ticket) is rented/substituted.

As described above, the present communication restriction control system can be applied to various styles. In addition, in the communication restriction control area, various allowed communications such as a communication system, communication quality, a service, etc. can be used.

Described below is the relationship between the service area of radio base station of the mobile communications system and the communication restriction control area.

Figure 21:
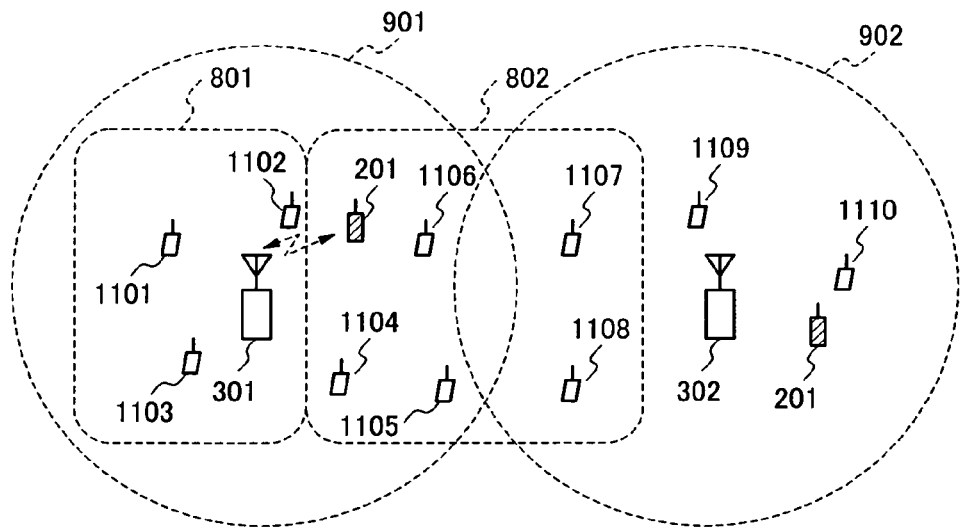
FIG. 21 is a schematic drawing showing the relationship between the radio base station service area and the communication restriction control area in the communication restriction control system according to the first embodiment of the present invention shown in FIG. 1.

FIG. 21 is a schematic drawing of the relationship between the service area of radio base station and the communication restriction control area in the communication restriction control system according to the present embodiment. Referring to FIG. 21, the service area 901 covered by the base station 301 is arranged adjacent to the service area 902 covered by the base station 302. In the service area 901, the fixed type radio response equipments 1101 to 1106 are arranged. In the service area 902, the fixed type radio response equipments 1107 to 1110 are arranged. The communication restriction control area 801 is formed by the fixed type radio response equipments 1101 to 1103, and the communication restriction control area 802 is formed by the fixed type radio response equipments 1104 to 1108. Thus, in the radio base station service area, a communication restriction control area of an optional shape can be formed. Therefore, in the communication restriction control system according to the present embodiment, a communication restriction control area can be arranged without restrictions by the arrangement of the radio base station of the mobile communications system.

Embodiment 2

It is hard for an operator of the communication restriction control system to realize the situation of a local place in a building of a corporation, a concert hall, a train, etc. In addition, it is a very complicated process or management to keep up with the change of the internal conditions. Therefore, it is desired to install the communication system discriminating equipment in a local place aside from the communication system discriminating equipment on the core equipment side. In this example, the embodiment of distributed arrangement for the communication system discriminating equipments is explained below.

Figure 22:
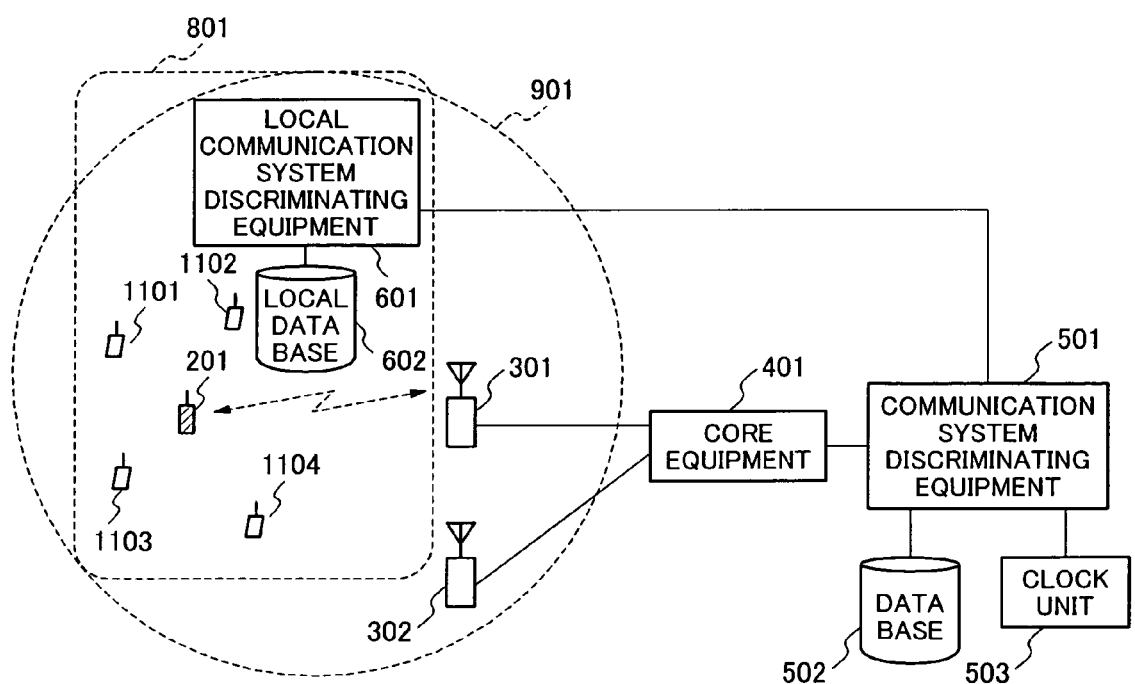
FIG. 22 is a block diagram of the rough configuration of the communication restriction control system according to the second embodiment of the present invention.

FIG. 22 is a block diagram showing the rough configuration of the communication restriction control system according to the second embodiment of the present invention. The communication restriction control system according to the present embodiment is different from the communication restriction control system according to the first embodiment in that the local communication system discriminating equipment 601 different from the communication system discriminating equipment 501 is included. Otherwise, since the configuration is basically the same as that of the communication restriction control system according to the first embodiment, the explanation given here concentrates on the characteristic configuration and operations.

Referring to FIG. 22, the fixed type radio response equipments 1101 to 1104 are arranged in the service area 901 of the radio base stations 301 and 302, and the communication restriction control area 801 is formed by the fixed type radio response equipments 1101 to 1104. The local communication system discriminating equipment 601 is arranged in the communication restriction control area 801, and is connected to the communication system discriminating equipment 501 over a network. The communication restriction control area 801 corresponds to, for example, a place in a building of a corporation, a concert hall, a train, etc. The local communication system discriminating equipment 601 has the local data base 602 storing each piece of identification information of the fixed type radio response equipments 1101 to 1104 associated with the information about the communication system allowed in the communication restriction control area 801.

Figure 23:
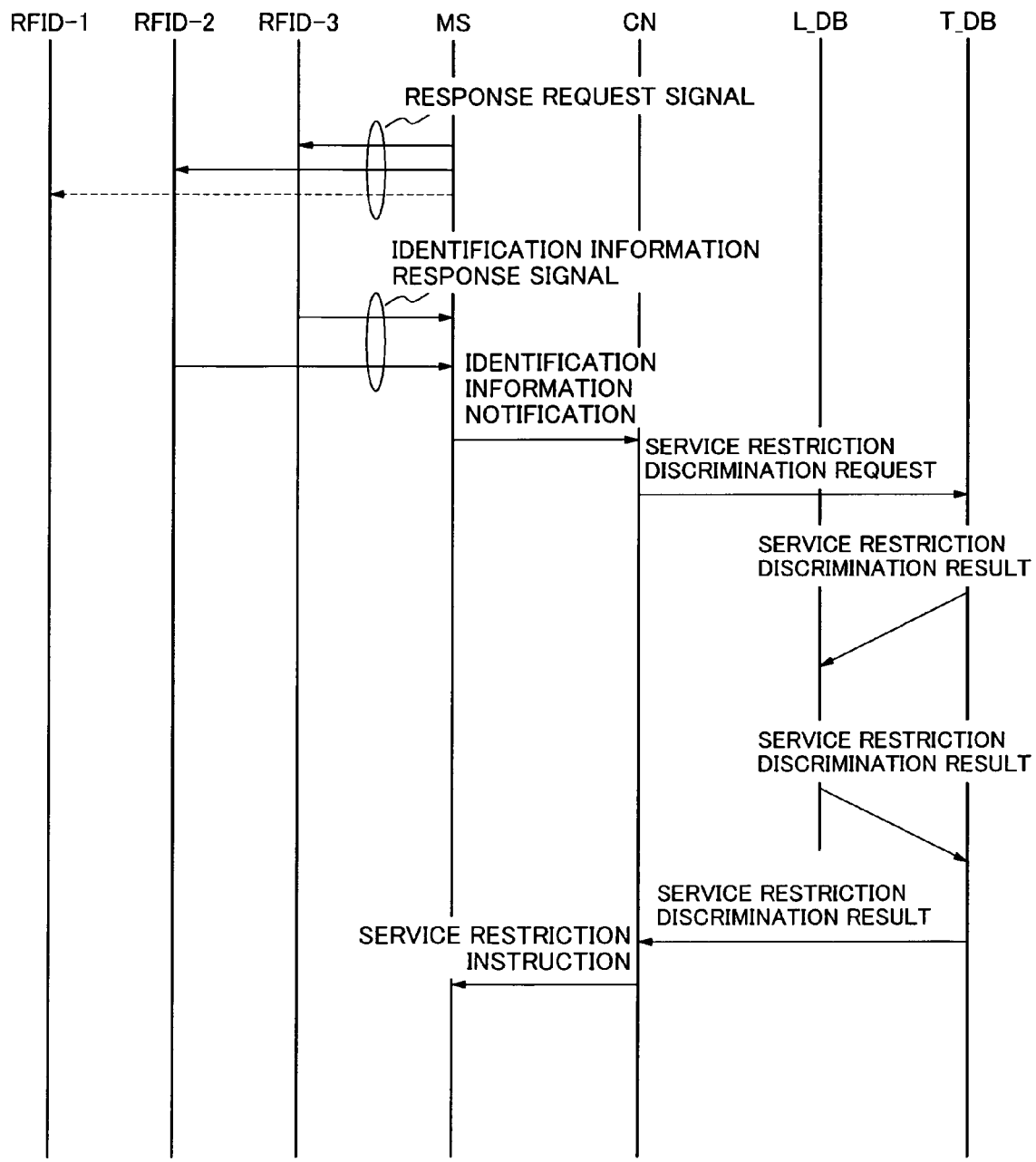
FIG. 23 is a signal sequence chart showing the restriction control operation performed by the communication restriction control system according to the second embodiment of the present invention shown in FIG. 22.

FIG. 23 shows the signal sequence of the communication restriction control system shown in FIG. 22. In FIG. 23, the RFID-1 to RFID-3 correspond to any of the fixed type radio response equipments 1101 to 1104. The MS, CN, L_DB, and T_DB respectively correspond to the mobile terminal 201, the core equipment 401, the local communication system discriminating equipment 601 (including the local database 602), and the communication system discriminating equipment 501 (including data base 502).

The mobile terminal MS transmits a response request signal to the radio response equipments RFID-1 to RFID-3 scattered in the vicinity when the execution of a service starts. In this example, it is assumed that the radio response equipment RFID-2 and the radio response equipment RFID-3 in the radio response equipments RFID-1 to RFID-3 are located in the position in which the radio communication can be performed with the mobile terminal MS, and the radio response equipment RFID-1 is located in the position in which the radio communication cannot be performed with the mobile terminal MS.

When each of the radio response equipments RFID-2 and RFID-3 receives a response request signal from the mobile terminal MS, each of them returns the response signal including the radio response equipment identification information of the corresponding equipment to the mobile terminal MS. Since the response request signal from the mobile terminal MS does not reach the radio response equipment RFID-1, the radio response equipment RFID-1 does not return the response signal to the mobile terminal MS. In FIG. 23, the response request signal indicated by the arrow of solid lines shows that a signal has correctly reached the equipment pointed to by the arrow, and the response request signal indicated by the arrow of dotted lines shows that a signal has not correctly reached the equipment pointed to by the arrow. Whether or not the response request signal correctly reaches depends on the distance between the mobile terminal MS and each of the radio response equipments RFID-1 to RFID-3. Based on this, the radio response equipment near the mobile terminal MS can be specified.

When the mobile terminal MS receives the response signal from the radio response equipments RFID-2 and RFID-3, they extracts the radio response equipment identification information included in the received response signal, and notify the core equipment CN of the extracted information. Upon receipt of the notification of the radio response equipment identification information, the core equipment CN transmits the discrimination request signal of the service restriction including the radio response equipment identification information to the communication system discriminating equipment T_DB.

The communication system discriminating equipment T_DB provides the radio response equipment identification information included in the discrimination request signal received from the core equipment to the local communication system discriminating equipment L_DB. According to the radio response equipment identification information provided by the communication system discriminating equipment T_DB, the local communication system discriminating equipment L_DB recognizes the geographical position of the mobile terminal MS and the existence of the entity (practically an object or a person to which the radio response equipment is attached) near the position. The local communication system discriminating equipment L_DB makes a determination as to what is an allowable communication system, whether or not a service desired by a mobile terminal can be executed, what is an executable service, etc. in the spatial position of the mobile terminal MS according to the information about each item stored in advance in a local data base 602 and the radio response equipment identification information provided from the communication system discriminating equipment T_DB. Then, the local communication system discriminating equipment L_DB transmits the determination result (service restriction discrimination result) to the core equipment CN through the communication system discriminating equipment T_DB.

Upon receipt of the service restriction discrimination result from the local communication system discriminating equipment L_DB, the core equipment CN notifies the mobile terminal MS of the information such as an executable communication system, communication quality, service restriction, etc. The mobile terminal MS follows the contents of the notification. For example, when the communication system for the communication restriction control is specified, only a mobile terminal using the specified communication system can be enabled for communications. When the communication quality is specified, a mobile terminal is permitted for the communications in the specified communication quality. When a service for the communication restriction control is specified, a mobile terminal is permitted for the communications in the specified service.

When plural communication restriction control areas are provided, and the local communication system discriminating equipment 601 is arranged in each of the areas, it is necessary for the communication system discriminating equipment 501 to determine to which local communication system discriminating equipment 601 the radio response equipment identification information is to be transmitted. In this determination, the communication system discriminating equipment 501 specifies one or more communication restriction control area included in the radio base station which receives the radio response equipment identification information collected by the mobile terminal 201, and specifies the local communication system discriminating equipment 601 arranged in the communication restriction control area.

A configuration for switching between the communication system discrimination by the communication system discriminating equipment 501 and the communication system discrimination by the local communication system discriminating equipment 601 can also be arranged. The determination of performing switching is made based on the radio base station area in which the mobile terminal 201 is currently located. In this case, the database 502 of the communication system discriminating equipment 501 stores the identification information of the radio base station associated with the identification information of the communication system discriminating equipment 501 or the local communication system discriminating equipment 601. The core equipment provides the identification information of the radio base station to the communication system discriminating equipment 501 in addition to the radio response equipment identification information provided by a mobile terminal, and the communication system discriminating equipment 501 confirms the communication system discriminating equipment which performs discrimination according to the identification information of the radio base station. When the communication system discriminating equipment 501 is specified as a communication system discriminating equipment for performing discrimination, it discriminates the communication system for the communication restriction control as explained by referring to the above described first embodiment based on the radio response equipment identification information provided from the core equipment and contents of the database 502. When the other communication system discriminating equipment is specified, the radio response equipment identification information provided by the core equipment is transferred to the specified communication system discriminating equipment.

Figure 24:
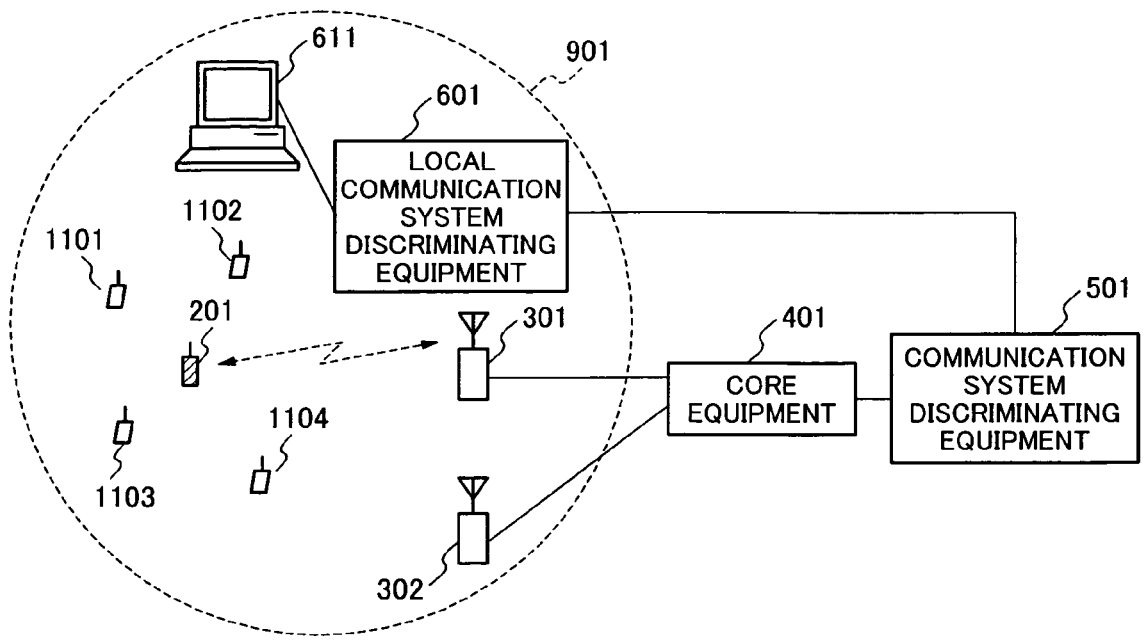
FIG. 24 is a block diagram showing an example of a variation of the communication restriction control system shown in FIG. 22.

In the system shown in FIG. 22, an information processing terminal for setting various information of the local communication system discriminating equipment 601 can be installed. FIG. 24 shows an example thereof.

Referring to FIG. 24, the information processing terminal 611 is connected to the local communication system discriminating equipment 601. The information processing terminal 611 is constituted by a computer system having a communication function, and is installed by an administrator of the communication restriction control area formed by the fixed type radio response equipments 1101 to 1104. The administrator can use the information processing terminal 611 to input (register information in a database, etc.) or set various types of information in the local communication system discriminating equipment 601. Thus, a communication system, communication quality, a service, etc. allowed in the communication restriction control area can be set/reset.

In the above-mentioned communication restriction control systems of the first and second embodiments, a mobile terminal transmits a response request signal when the communication starts or at predetermined time intervals during communication being performed. When a mobile terminal which is performing a service encounters a change of circumstances after starting the service, the mobile terminal transmits the response request signal to the radio response equipments located in the vicinity when notification information is received from the core equipment of the mobile communications system, or the mobile terminal transmits the response request signal in a predetermined time period which has been notified at the time of communication start. Then, by transferring the received response signal to the core equipment, the communication system or communication quality to be selected by moving the mobile terminal or the entity around the mobile terminal is determined.

Figure 25:
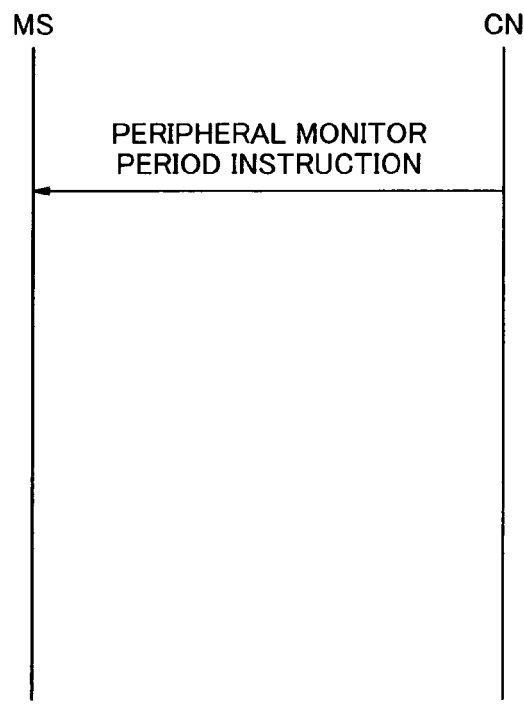
FIG. 25 is an explanatory view showing the procedure of controlling the transmission of a response request signal by a mobile terminal by monitoring the peripheral situation during execution of services.
Figure 26:
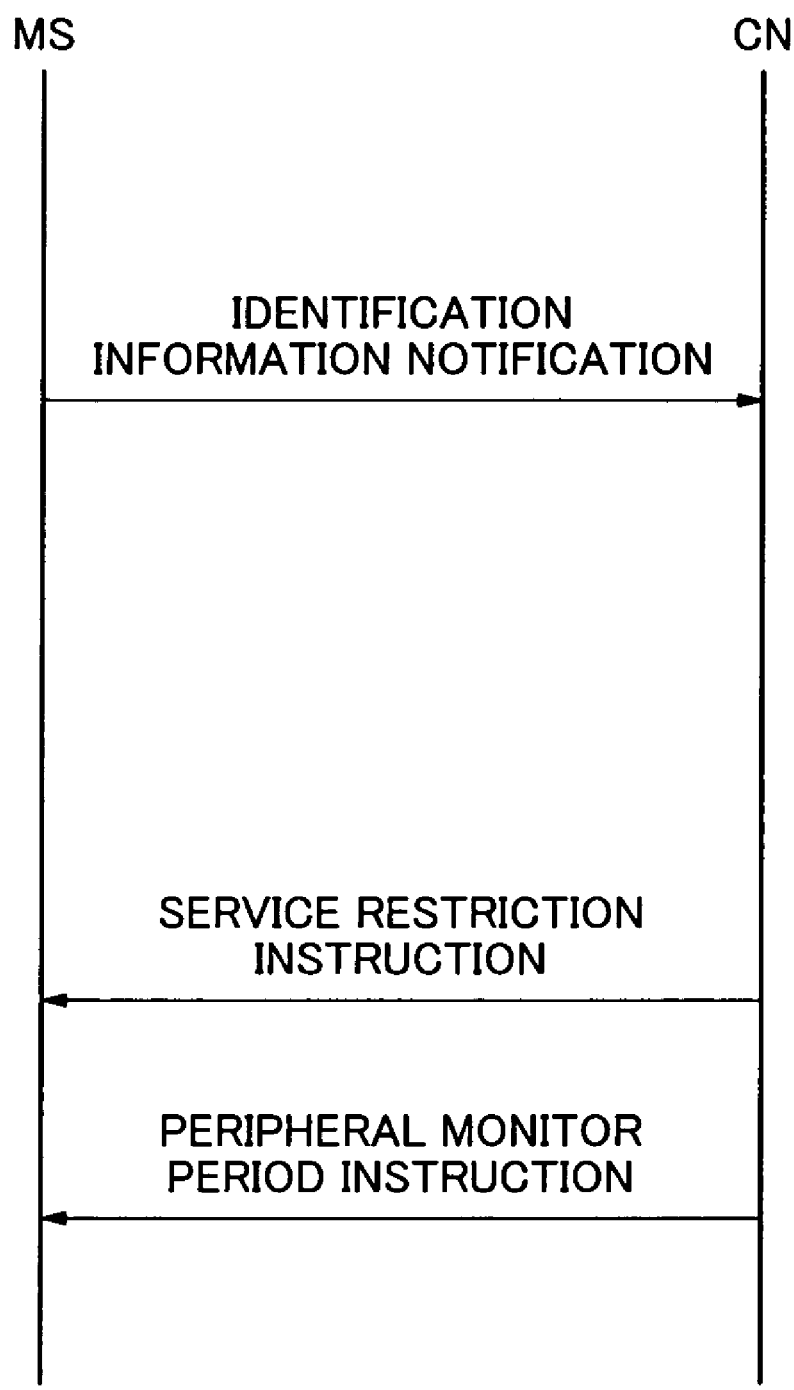
FIG. 26 is an explanatory view showing another procedure of controlling the transmission of a response request signal by a mobile terminal by monitoring the peripheral situation during execution of services.

FIGS. 25 and 26 show the signal sequence procedure of restricting the communication system and communication quality according to the obtained information monitoring the circumstances during executing a service.

In FIG. 25, MS designates a mobile terminal, and CN designates a core equipment. The mobile terminal MS obtains from the core equipment the monitor period of the fixed type or non-fixed type radio response equipment located around the mobile terminal when the communication starts. As shown in FIG. 26, the mobile terminal MS transfers the radio response equipment identification information to the core equipment CN at the start of communication, the core equipment issues a service restriction instruction to the mobile terminal MS, and transmits the monitor period of the fixed type or non-fixed type radio response equipment located around in the communication restriction control area. By performing any of the procedures, the mobile terminal MS transmits the response request signal in the monitor period provided by the core equipment in the communication restriction control area in which the mobile terminal is located.

Figure 27:
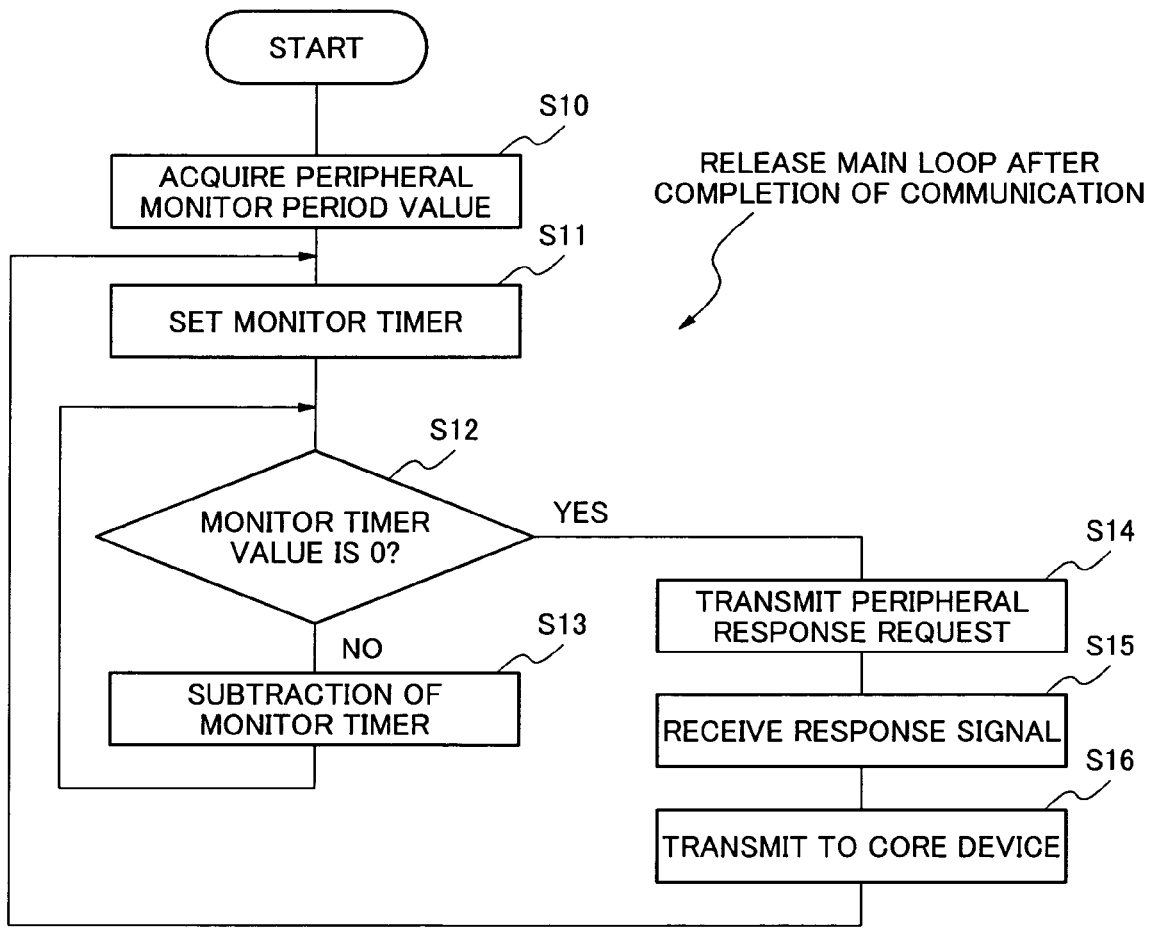
FIG. 27 is a flowchart showing the procedure of the operation based on the monitor period in a mobile terminal.

FIG. 27 is a flowchart of a procedure of the operation based on the monitor period of a mobile terminal. First, the peripheral monitor period value is acquired from the core equipment (step S10), and a monitor timer is set (step S11). Then, it is determined whether or not the value of the monitor timer indicates "0" (step S12). If the determination is "No", the monitor timer value is subtracted by 1 (step S13), and the determination in step S12 is performed again. If the determination in step S12 is "Yes", then each operation of transmitting the response request signal to a peripheral device (step S14), receiving the response signal (step S15), and transmitting radio response equipment identification information (step S16) is performed, and then control is returned to setting the monitor timer in step S11. The loop in steps S11 to S16 is released at the time of communication completion.

In the procedure above in which the circumstances are monitored during executing a service, the communication system, communication quality, a service, etc. can be selected/directed depending on the circumstances.

Described below is the procedure of selecting a communication system depending on the circumstances around the mobile terminal user in relation to the communication/service type table shown in FIG. 14. In FIG. 1, the mobile terminal 201 can derive the communication system allowed in the area from the communication/service type table shown in FIG. 14 based on the radio response equipment identification information obtained from the non-fixed type radio response equipment 1151 or the fixed type radio response equipments 1101 and 1102 around the mobile terminal 201. The mobile terminal user can use a so-called "Dual Mode" terminal or "Multi Mode" terminal capable of using plural communication systems or modulation systems as described above, and can also use a "Single Mode" terminal which cannot use these plural communication systems or modulation systems. In this case, if the communication/service type table shown in FIG. 14 indicates that the TDMA system is prohibited but the CDMA system is permitted, then the "Dual Mode" terminal of the TDMA system and the CDMA system can perform communications by the CDMA system although the communication by the TDMA system is disabled. However, the "Single Mode Terminal" of the TDMA system only cannot perform the communication by the CDMA system. Therefore, the communication for the "Single Mode Terminal" is rejected. Similarly, if the communication/service type table shown in FIG. 14 indicates that a mobile telephone system having a large-scale radio base station is prohibited but the wireless LAN system is permitted, then a mobile terminal capable of using both the mobile telephone system and the wireless LAN system can perform a communication by the wireless LAN system although the mobile terminal user is rejected when the user tries to start the communication by the mobile telephone system. However, if the mobile terminal can be used only in the mobile telephone system, the communication cannot be performed because the communication by the mobile telephone system is disabled. That is, in the communication restriction control system according to the present invention, there can be a case where a communication is permitted and rejected in a specific area depending on the capability of the mobile terminal.

Other Embodiments

With the communication restriction control system in the above-mentioned first and second embodiments, a communication system, communication quality, a service, etc. allowed in the communication restriction control area is discriminated according to the radio response equipment identification information acquired from the non-fixed type radio response equipment. However, it is also possible to identify an object (or a person having the non-fixed type radio response equipment), to which the non-fixed type radio response equipment is attached, according to the radio response equipment identification information acquired from the non-fixed type radio response equipment. That is, since the mobile terminal can acquire the radio response equipment identification information of the non-fixed type radio response equipments in the vicinity, it can specify the current position of the moving object (or person), to which a non-fixed type radio response equipment is attached, according to the radio response equipment identification information and the current position information of the mobile terminal 201. Thus, for example, a lost object, to which the non-fixed type radio response equipment is attached, can be searched for by unspecified number of mobile terminals. Described below is the system capable of searching for such a lost object.

Figure 28:
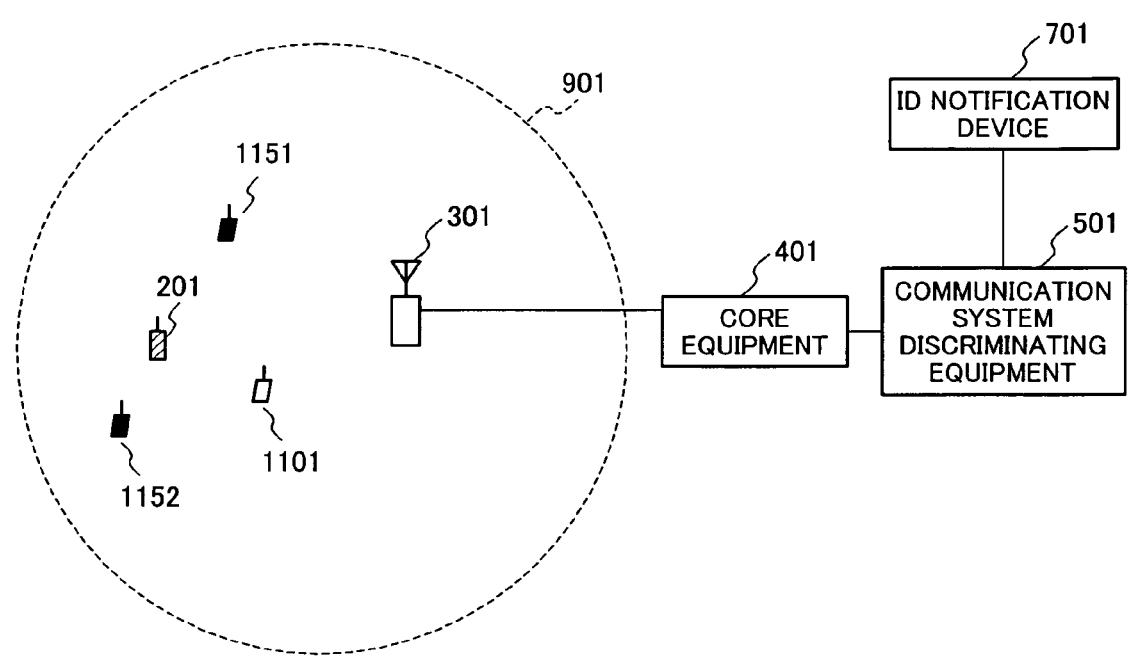
FIG. 28 is a block diagram showing the rough configuration of a system according to another embodiment of the present invention.

FIG. 28 shows the rough configuration of the system according to another embodiment of the present invention. Referring to FIG. 28, the system also includes an ID notification device 701 in the system shown in FIG. 1. The configuration except the ID notification device 701 is basically the same as the configuration of the communication restriction control system according to the first embodiment. The ID notification device 701 is connected to the communication system discriminating equipment 501 for mutual communication.

The communication system discriminating equipment 501 determines the communication system, communication quality, a service for the mobile terminal 201, and provides the ID notification device 701 with the identification information of the radio response equipment provided by the mobile terminal 201. The ID notification device 701 determines whether or not the non-fixed type radio response equipment located around the mobile terminal 201 relates to a lost object according to the radio response equipment identification information.

Figure 29:
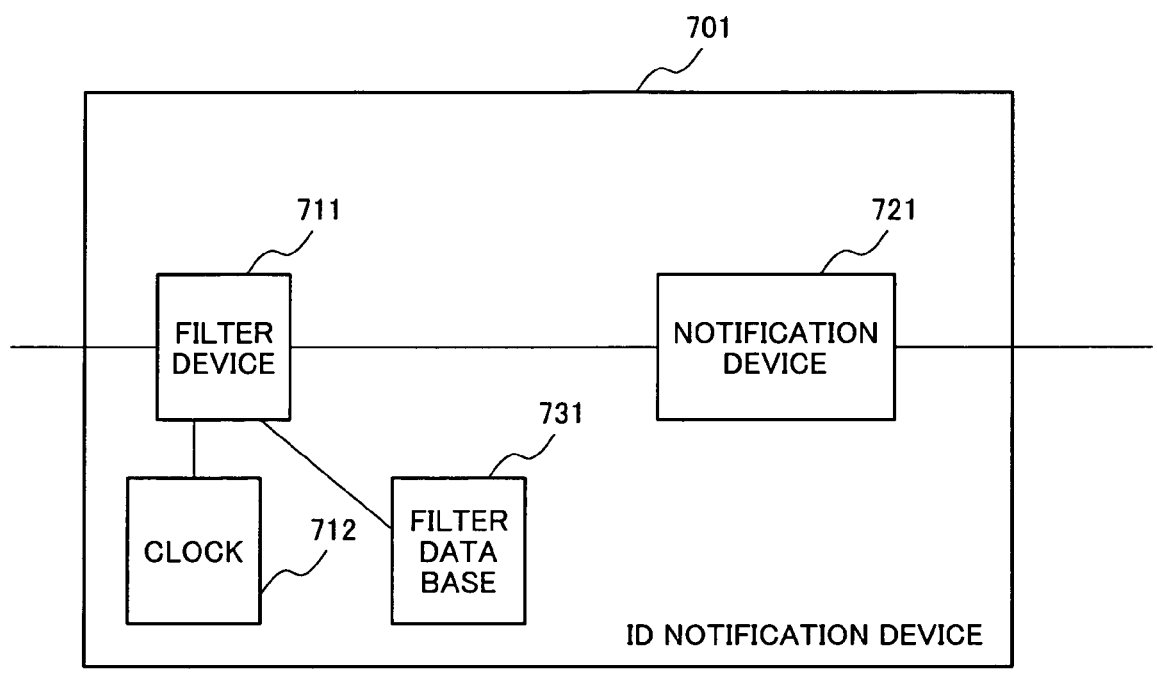
FIG. 29 is a block diagram showing the configuration of the main portion of the ID notice equipment of the system shown in FIG. 28.

FIG. 29 shows the configuration of the main portion of the ID notification device 701. Referring to FIG. 29, the ID notification device 701 includes a filter device 711, a notification device 721, and a filter database 731. The filter database 731 stores the radio response equipment identification information of the non-fixed type radio response equipment attached to a reported lost object associated with the destination information (for example, a mail address) to be referred to when the lost object is found.

The radio response equipment identification information transferred from the communication system discriminating equipment 501 is provided to the filter device 711. The filter device 711 has a clock 712 indicating the current time. The filter device 711 determines whether or not the radio response equipment identification information provided from the communication system discriminating equipment 501 has been registered in the filter database 731. If it has been registered, the filter device 711 acquires the time information of the time when the radio response equipment identification information was received according to the current time information from the clock 712. The filter device 711 acquires from the filter database 731 the destination information stored as associated with the radio response equipment identification information. The filter device 711 also acquires the current position information of the mobile terminal 201 as the source of the radio response equipment identification information from the core equipment 401 through the communication system discriminating equipment 501. Then, the filter device 711 provides the notification device 721 with the notice signal including the reception time information, the destination information, and the mobile terminal current position information. The notification device 721 transmits the notice signal provided from the filter device 711 according to the destination information included in the signal.

In the operation above, when a moving object, to which a non-fixed type radio response equipment whose identification information is registered in the filter database 731 is attached, approaches the mobile terminal 201, the mobile terminal 201 acquires the radio response equipment identification information from the non-fixed type radio response equipment, and provides it to the communication system discriminating equipment 501. The radio response equipment identification information provided to the communication system discriminating equipment 501 is further provided to the filter device 711, and it is determined whether or not it is the lost object. If it is determined that the lost object has been found, the reception time information and the current position information about the mobile terminal 201 are noticed to the destination specified by the person who presented the report about the lost object. According to the notice, the person who presented the report about the lost object can determine the current position of the lost object. The current position information of the mobile terminal 201 corresponds to the current position of the lost object.

If the radio response equipment identification information registered in the filter database 731 is the radio response equipment identification information of the non-fixed type radio response equipment attached to, for example, a specific person or in an object constantly carried by the person, then the information of the current position of the specific person can be directly or indirectly noticed to the person who registered inquiry.

The above-mentioned configurations and operations of the communication restriction control system according to the embodiments are examples only of the present invention, and they can be appropriate varied within the gist of the present invention.

The core equipment and the communication system discriminating equipment can be realized as one device (communication system discriminating means 400 in FIG. 1).

The radio response equipment is not always a radio response equipment of the communication restriction control system of the present invention. That is, the radio response equipment can be a device placed for the communication restriction control system of the present invention or a part of it, can be an accessory device to the system different from the communication restriction control system of the present invention, for example, an index of the location management system of a mobile terminal, a tag attached to a product for inventory management and trail management of the product, a donor card owned by a person himself or herself, or a device implanted in a living body of a person, etc. The radio response equipment can be any type of device so far as it has corresponding means at a request from a mobile terminal.

The mobile communications system to which the communication restriction control system of the present invention is applied includes, for example, a vehicle/mobile telephone system represented by a cellular system, a satellite communication system, a wireless LAN system, etc.

The previous description of embodiments is provided to enable a person skilled in the art to make and use the present invention. Moreover, various modifications to these embodiments will be readily apparent to those skilled in the art, and the generic principles and specific examples defined herein may be applied to other embodiments without the use of inventive faculty. Therefore, the present invention is not intended to be limited to the embodiments described herein but is to be accorded the widest scope as defined by the limitations of the claims and equivalents.

Further, it is noted that the inventor's intent is to refrain all equivalents of the claimed invention even if the claims are amended during prosecution.

What is claimed is:

1. A communication restriction control system in a mobile communication network, comprising:
   a mobile terminal, which performs communication over the mobile communication network using at least one of plural communication systems, and transmitting a response request signal in radio communication when the communication starts;
   a radio response equipment, which performs the radio communication in a range of a predetermined communication distance, and transmits a response signal including radio response equipment identification information of own equipment in the radio communication when the response request signal is received; and a communication system discriminating equipment, which is provided with a database storing information in which the radio response equipment identification information is associated with an allowable communication system, performs communication with the mobile terminal through the mobile communication network for receiving the radio response equipment identification information which is included in the response signal received by the mobile terminal, determines an allowable communication system by referring to the database according to the radio response equipment identification information received from the mobile terminal, and controls communication of the mobile terminal according to the determined allowable communication system.

2. The communication restriction control system according to claim 1, wherein
the mobile terminal is able to perform communication with at least one of plural communication qualities over the mobile communication network; and
the communication system discriminating equipment has a database storing information in which the radio response equipment identification information is associated with the communication quality, determines allowed communication quality by referring to the database according to the radio response equipment identification information received from the mobile terminal, and controls communication of the mobile terminal based on the allowed communication quality.

3. The communication restriction control system according to claim 1, wherein
the mobile terminal is able to perform communication with at least one of plural communication services over the mobile communication network; and
the communication system discriminating equipment has a database storing information in which the radio response equipment identification information is associated with the communication service, determines allowed communication service by referring to the database according to the radio response equipment identification information received from the mobile terminal, and controls communication of the mobile terminal based on the allowed communication service.

4. The communication restriction control system according to claim 1, wherein
the radio response equipment is formed by a fixed type radio response equipment attached to a fixed object and a non-fixed type radio response equipment attached to a moving object; and
the database is set such that information stored as associated with identification information of the non-fixed type radio response equipment is prioritized over information stored as associated with identification information of the fixed type radio response equipment.

5. The communication restriction control system according to claim 2, wherein
the radio response equipment is formed by a fixed type radio response equipment attached to a fixed object and a non-fixed type radio response equipment attached to a moving object; and
the database is set such that information stored as associated with identification information of the non-fixed type radio response equipment is prioritized over information stored as associated with identification information of the fixed type radio response equipment.

6. The communication restriction control system according to claim 3, wherein
the radio response equipment is formed by a fixed type radio response equipment attached to a fixed object and a non-fixed type radio response equipment attached to a moving object; and
the database is set such that information stored as associated with identification information of the non-fixed type radio response equipment is prioritized over information stored as associated with identification information of the fixed type radio response equipment.

7. The communication restriction control system according to claim 1, wherein
the database stores the radio response equipment identification information associated with the communication system and a time period in which the communication system is executed; and
the communication system discriminating equipment has a clock unit for acquiring a current time, and executes communication restriction control of the mobile terminal for the communication system determined by referring to the database based on the current time acquired from the clock unit and the time period obtained from the database.

8. The communication restriction control system according to claim 2, wherein
the database stores the radio response equipment identification information associated with the communication quality and a time period in which the communication quality is executed; and
the communication system discriminating equipment has a clock unit for acquiring a current time, and executes communication restriction control of the mobile terminal for the communication quality determined by referring to the database based on the current time acquired from the clock unit and the time period obtained from the database.

9. The communication restriction control system according to claim 3, wherein
the database stores the radio response equipment identification information associated with the communication service and a time period in which the communication service is executed; and
the communication system discriminating equipment has a clock unit for acquiring a current time, and executes communication restriction control of the mobile terminal for the communication service determined by referring to the database based on the current time acquired from the clock unit and the time period obtained from the database.

10. The communication restriction control system according to claim 1, further comprising:
a local communication system discriminating equipment, which is installed in a communication restriction control area and connected to the communication system discriminating equipment through communication network, provided with a local database storing information in which the radio response equipment identification information is associated with one of allowable communication system, communication quality and communication service, determines one of communication system, communication quality and communication service allowed in the communication restriction control area by referring to the local database with the radio response equipment identification information transmitted from the communication system discriminating equipment, and returns the determination result to the communication system discriminating equipment; and wherein the communication system discriminating equipment performs communication restriction control of the mobile terminal based on the determined result.

11. The communication restriction control system according to claim 1, wherein the mobile terminal transmits the response request signal at predetermined time intervals in accordance with an instruction from the communication system discriminating equipment.

12. The communication restriction control system according to claim 2, wherein the mobile terminal transmits the response request signal at predetermined time intervals in accordance with an instruction from the communication system discriminating equipment.

13. The communication restriction control system according to claim 3, wherein the mobile terminal transmits the response request signal at predetermined time intervals in accordance with an instruction from the communication system discriminating equipment.

14. The communication restriction control system according to claim 1, wherein the communication system prescribes a different modulation system, or prescribes continuous transmission and intermittent transmission.

15. The communication restriction control system according to claim 2, wherein the communication quality prescribes one of an amount of transmission power of the mobile terminal and a communication speed relating to a transfer rate of transfer information of the mobile terminal.

16. The communication restriction control system according to claim 1, wherein the communication system discriminating equipment comprising:
 a core equipment, which is an upper hierarchical station of a radio base station forming part of the mobile communication network, and performs communication restriction control of the mobile terminal based on a discrimination result of the communication system to be restricted.

17. The communication restriction control system according to claim 16, further comprising:
 A local communication system discriminating equipment which is installed in a communication restriction control area prescribed by radio communication areas of a plurality of radio response equipments and can mutually communicate with the communication system discriminating equipment; and
 wherein the local communication system discriminating equipment discriminates one of communication system, communication quality and communication service, and the core equipment performs communication restriction control of the mobile terminal based on the discrimination result.

18. The communication restriction control system according to claim 2, wherein the communication system discriminating equipment comprising:
 a core equipment, which is an upper hierarchical station of a radio base station forming part of the mobile communication network, and performs communication restriction control of the mobile terminal based on a discrimination result.

19. The communication restriction control system according to claim 18, further comprising:
 A local communication system discriminating equipment which is provided in a communication restriction control area prescribed by a plurality of radio communication areas of the radio response equipments and can mutually communicate with the communication system discriminating equipment; and
 wherein the local communication system discriminating equipment discriminates the communication quality, and the core equipment performs communication restriction control of the mobile terminal based on the discrimination result.

20. The communication restriction control system according to claim 3, wherein the communication system discriminating equipment comprising:
 a core equipment, which is an upper hierarchical station of a radio base station forming part of the mobile communication network, and performs communication restriction control of the mobile terminal based on a discrimination result.

21. The communication restriction control system according to claim 20, further comprising:
 A local communication system discriminating equipment which is provided in a communication restriction control area prescribed by a plurality of radio communication areas of the radio response equipments and can mutually communicate with the communication system discriminating equipment; and
 wherein the local communication system discriminating equipment discriminates the communication service, and the core equipment performs communication restriction control of the mobile terminal based on the discrimination result.

22. The communication restriction control system according to claim 16, further comprising:
 an ID notification device capable of mutually communicating with the communication system discriminating equipment, wherein
 the ID notification device comprising:
 a filter database storing identification information of the non-fixed type radio response equipment attached to a specific moving object as the radio response equipment associated with predetermined destination information;
 a notice device for transmitting provided notice information according to the destination information included in the notice information; and
 a filter device for determining whether or not the radio response equipment identification information provided from the communication system discriminating equipment is registered in the filter database, acquiring destination information stored as associated with the radio response equipment identification information from the filter database if the information is registered, acquiring a current position of a mobile terminal which transfers the radio response equipment identification information from the core equipment through a communication system discriminating equipment, and providing the acquired current position and destination information as the notice information for the notice device.

23. The communication restriction control system according to claim 18, further comprising:
 an ID notification device capable of mutually communicating with the communication system discriminating equipment, wherein
 the ID notification device comprises:
 a filter database storing identification information of the non-fixed type radio response equipment attached to a specific moving object as the radio response equipment associated with predetermined destination information;
 a notice device for transmitting provided notice information according to the destination information included in the notice information; and a filter device for determining whether or not the radio response equipment identification information provided from the communication system discriminating equipment is registered in the filter database, acquiring destination information stored as associated with the radio response equipment identification information from the filter database if the information is registered, acquiring a current position of a mobile terminal which transfers the radio response equipment identification information from the core equipment through a communication system discriminating equipment, and providing the acquired current position and destination information as the notice information for the notice device.

24. The communication restriction control system according to claim 20, further comprising
an ID notification device capable of mutually communicating with the communication system discriminating equipment, wherein
the ID notification device comprises:
a filter database storing identification information of the non-fixed type radio response equipment attached to a specific moving object as the radio response equipment associated with predetermined destination information;
a notice device for transmitting provided notice information according to the destination information included in the notice information; and
a filter device for determining whether or not the radio response equipment identification information provided from the communication system discriminating equipment is registered in the filter database, acquiring destination information stored as associated with the radio response equipment identification information from the filter database if the information is registered, acquiring a current position of a mobile terminal which transfers the radio response equipment identification information from the core equipment through a communication system discriminating equipment, and providing the acquired current position and destination information as the notice information for the notice device.

25. A communication restriction control method over a mobile communication network, comprising the steps of:
transmitting a response request signal to a radio response equipment capable of performing radio communication in a range of a predetermined communication distance when a mobile terminal start communication over the mobile communication network;
transmitting a response signal including identification information of the radio response equipment when the radio response equipment receives the response request signal;
transmitting identification information included in the received response signal to a communication system discriminating equipment through the mobile communication network when the mobile terminal has received the response signal;
retrieving a database of the communication system discriminating equipment, in which the identification information of the radio response equipment is associated with the communication system information;
determining an allowable communication system according to the identification information of the radio response equipment; and
performing communication restriction control of the mobile terminal based on the determined allowable communication system.

26. The communication restriction control method according to claim 25, wherein the database of the communication system discriminating equipment, in which the identification information of the radio response equipment is associated with the communication quality information, and comprising the steps of:
determining an allowed communication quality according to the identification information of the radio response equipment; and
performing communication restriction control of the mobile terminal based on the determined allowed communication quality.

27. The communication restriction control method according to claim 25, wherein the database of the communication system discriminating equipment, in which the identification information of the radio response equipment is associated with the communication service information, and comprising the steps of:
determining an allowed communication service according to the identification information of the radio response equipment; and
performing communication restriction control of the mobile terminal based on the determined allowed communication service.

* * * * *